United States Patent
Bush

(10) Patent No.: US 9,176,656 B1
(45) Date of Patent: Nov. 3, 2015

(54) GRAPHICAL INPUT DISPLAY HAVING A SEGMENTED SCROLLBAR AND ESCAPE HATCH TO FACILITATE NAVIGATING LARGE BODIES OF CONTENT

(71) Applicant: Google Inc., Mountain View, CA (US)

(72) Inventor: Kathryn Bush, San Francisco, CA (US)

(73) Assignee: Google Inc., Mountain View, CA (US)

( * ) Notice: Subject to any disclaimer, the term of this patent is extended or adjusted under 35 U.S.C. 154(b) by 170 days.

(21) Appl. No.: 13/907,334

(22) Filed: May 31, 2013

(51) Int. Cl.
  *G06F 3/0485* (2013.01)
  *G06F 3/0483* (2013.01)

(52) U.S. Cl.
  CPC ............ *G06F 3/0485* (2013.01); *G06F 3/0483* (2013.01)

(58) Field of Classification Search
  CPC . G06F 19/321; G06F 19/322; G06F 3/04842; G06F 3/04845; G06F 3/0485; G06F 3/0488; G06F 3/0483; G06F 15/0291; G06F 17/211; G06F 2203/04806; G06F 2203/04808; G06F 3/0482; G06F 3/04883
  See application file for complete search history.

(56) References Cited

U.S. PATENT DOCUMENTS

| | | | |
|---|---|---|---|
| 6,738,084 B1 * | 5/2004 | Kelley et al. | 715/784 |
| 7,836,408 B1 | 11/2010 | Ollmann et al. | |
| 8,112,711 B2 * | 2/2012 | Ackley | 715/716 |
| 2005/0091597 A1 * | 4/2005 | Ackley | 715/716 |
| 2005/0097479 A1 | 5/2005 | Takabe et al. | |
| 2006/0117337 A1 | 6/2006 | Shivaji Rao et al. | |
| 2008/0295030 A1 * | 11/2008 | Laberge et al. | 715/831 |
| 2010/0146435 A1 * | 6/2010 | Cros | 715/786 |
| 2012/0089938 A1 * | 4/2012 | Homma et al. | 715/776 |
| 2012/0208592 A1 * | 8/2012 | Davis et al. | 455/556.1 |
| 2013/0073932 A1 * | 3/2013 | Migos et al. | 715/201 |

OTHER PUBLICATIONS

Eronen, L., et al., "User Interfaces for Digital Television: a Navigator Case Study," 2000, pp. 276-279.

* cited by examiner

*Primary Examiner* — William Bashore
*Assistant Examiner* — Rayeez Chowdhury
(74) *Attorney, Agent, or Firm* — Amin, Turocy & Watson, LLP

(57) ABSTRACT

A system for navigating large bodies of content is provided. The system includes an interface component configured to generate a user interface for navigating a body of content on a display device, the interface comprising a display area, a scrollbar comprising a plurality of segments, a scroll box and an exit command widget attached to the scroll box. Each of the plurality of segments are associated with respective portions of the body of content and the scroll box is configured to move over the plurality of segments to navigate through the body content and cause a respective portion of the body of the content to be displayed in the display area when the scroll box is positioned over a segment associated with the respective portion, and wherein the scroll box is configured to move to the exit command widget directly from a segment to focus on the exit command widget.

17 Claims, 26 Drawing Sheets

GRAPHICAL INPUT DISPLAY HAVING A SEGMENTED SCROLLBAR AND ESCAPE HATCH TO FACILITATE NAVIGATING LARGE BODIES OF CONTENT

TECHNICAL FIELD

This disclosure relates system(s) and method(s) that facilitate navigating large bodies of content using a graphical input display having a segmented scrollbar and an escape hatch.

BACKGROUND

Navigating extensive bodies of text, such as those found in multiple page (e.g., 10-100 pages) "Terms of Service" documents, can be extremely difficult for users when text is displayed on a user interface of a device that does not provide for input using a traditional keyboard or keypad (e.g., a television screen and associated remote). For example, such large documents can be difficult to navigate through and/or "get in and out of," especially when using a basic remote controller having only up, down, left, right, select and cancel buttons. Users are often required to linearly "page through" or "scroll through" an entire body of text to reach the end to exit out of the large body of text and/or to re-navigate to a preferred area of the user interface.

DETAILED DESCRIPTION

Figure 1:
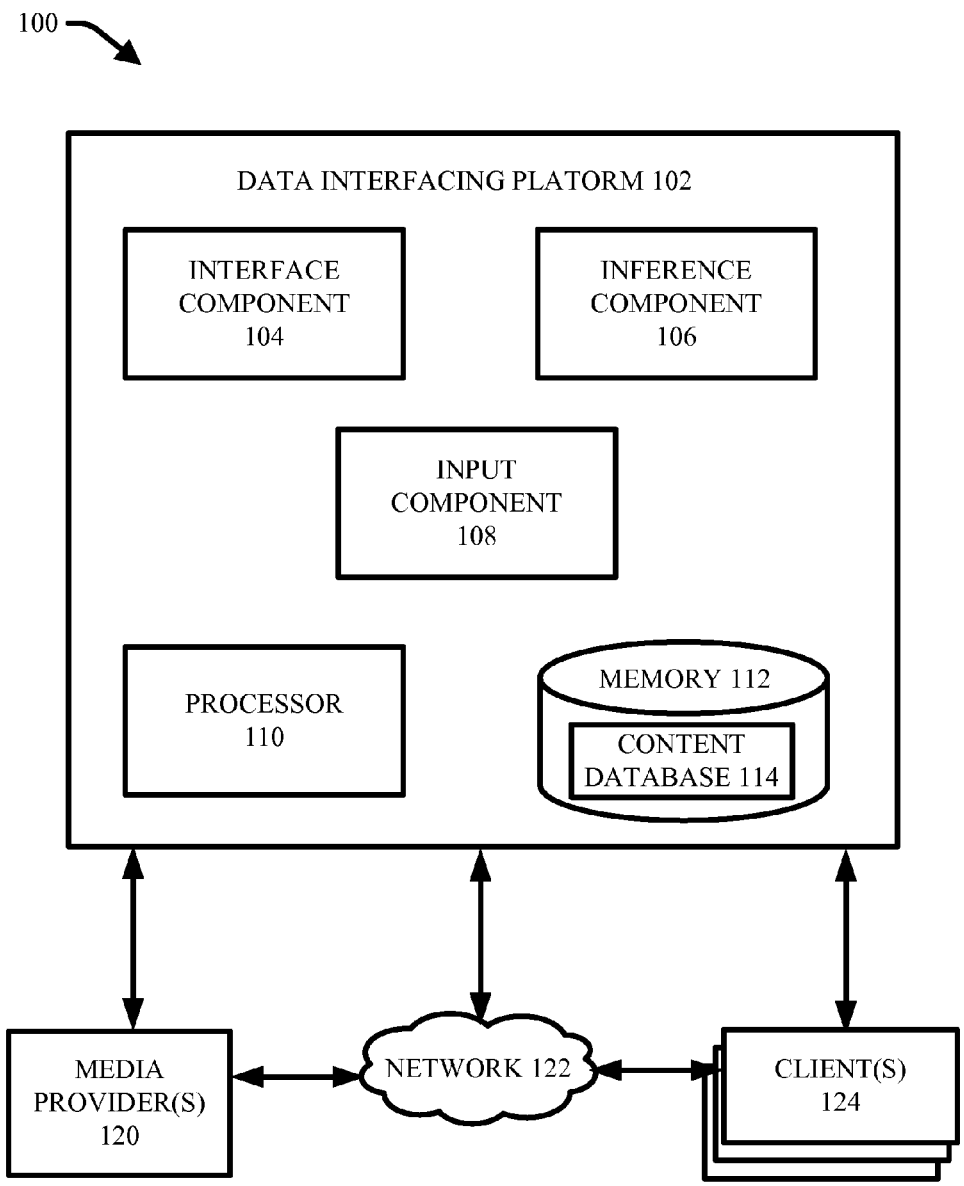
FIG. 1 illustrates a block diagram of an example system that facilitates navigating large bodies of content using a graphical interface having a segmented scrollbar and an escape hatch in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods that facilitate navigating and consuming large bodies of scrollable content, such as "Terms of Service" (ToS) text documents or multimedia libraries, using a graphical input display on device that does not provide for input using a traditional keyboard or keypad (e.g., a television screen). In accordance with an embodiment, a user interface is provided that includes a display area, a scrollbar comprising a plurality of segments, a scroll box configured to moves about the scroll bar and an exit command widget attached to the scroll box. Each of the plurality of segments can be associated with respective portions of the body of content, and the scroll box is configured to move over the plurality of segments to navigate through the body content and cause a respective portion of the body of the content to be displayed in the display area when the scroll box is positioned over a segment associated with the respective portion. In order to dismiss the content being displayed in the display area, rather than moving the scroll box to an end of the scrollbar to reach an exit or cancel button, a user can move directly to the exit widget attached to the scroll box. Upon selection of the exit command widget, the content being displayed in the display area can be dismissed.

In an aspect, the user interface is generated by a system that includes an inference component configured to position the scroll box over one of the plurality of segments associated with a portion of the body of content deemed most relevant or interesting to the user based on a preference of the user of a context of the user device at which the interface is displayed. For example, the inference component could infer that based on user preferences, song "ABC" in a playlist is a song the user would prefer to listen to above other songs in the playlist. Accordingly, the inference component can position the scroll box over a segment of the scrollbar that is associated with song "ABC." In another example, the body of content can include a troubleshooting document that includes instructions to diagnose and solve a current technical problem associated with a user device at which the interface is displayed. The troubleshooting document can include instructions for a wide range of technical issues. According to this example, the inference component can infer a specific technical issue the user device is currently facing, and locate the scroll box over the segment associated with a portion of the troubleshooting document related to the specific issue.

Referring now to the drawings, with reference to FIG. 1, presented is a system 100 having a data interfacing platform 102 that facilitates navigating large bodies of content provided on a device without a traditional keyboard or keypad input device in accordance with another embodiment. It should be appreciated that the disclosed interfaces can be used with any suitable input device (e.g., keyboard/keypad). The disclosed interfaces facilitate efficient interaction with a graphical input display user interface using an input device having basic command options (e.g., up/down/left/right, select, cancel, and etc.).

Aspects of the systems, apparatuses or processes described in this disclosure can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 112 for storing computer executable components and instructions. System 100 further includes a processor 110 to facilitate operation of the instructions (e.g., computer executable components and instructions) by system 100.

Data interfacing platform 102 is configured to generate a graphical input display user interface that facilitates efficient user navigation of large bodies of onscreen content, particularly using a basic controller (e.g., a controller having basic input keys such as an up/down/left right button, a cancel button and a select button). Data interfacing platform 102 can include at least an interface component 104, an inference component 106, and an input component 108. The interface component 104 can perform various functions associated with generating a graphical input display with the various features and functionality discussed herein. The inference component 106 can make respective determinations and inferences regarding what relevant portion of a large body of content to display and how to adapt the graphical input display to facilitate navigating to the relevant portion. The inference component 106 can further make determinations and inferences regarding how to display content on the graphical user interface.

The input component 108 can facilitate user interaction with the graphical input display user interface generated by the interface component 104. For example, input component 118 can be configured to receive commands from an input device (e.g., a controller, a keyboard, a mouse, a touch screen, voice recognition input device, a gesture recognition input device, etc., (not shown)), and interpret those commands to facilitate interaction with a graphical input display generated by interface component 104.

The interface component 104 can be configured to generate various graphical input display user interfaces as exemplified in FIGS. 3-22. Common features of the various interfaces discussed herein include a display area, a scrollbar comprising a plurality of segments, a scroll box configured to moves about the scroll bar and an exit command widget attached to the scroll box. For example, with reference to FIG. 3, interface component 104 can generate user interface 300. User interface 300 includes a display area 302 in which a ToS agreement is presented. The ToS can include several pages of text where only one portion or page of the text can be displayed at a time in the display area 302. The interface 300 further includes a scrollbar 324 that has a plurality of segments 304, 306, 308, 310, 312, 314 (collectively referred to as segments 304-314). Each of the plurality of segments 304-314 are associated with respective portions of the body of text of the ToS. For example, segment 308 can be associated with page 3 of 6 of the ToS document, segment 310 can be associated with page 4 of 6 of the ToS, segment 312 can be associated with page 5 of 6 of the ToS, and so on.

Figure 3:
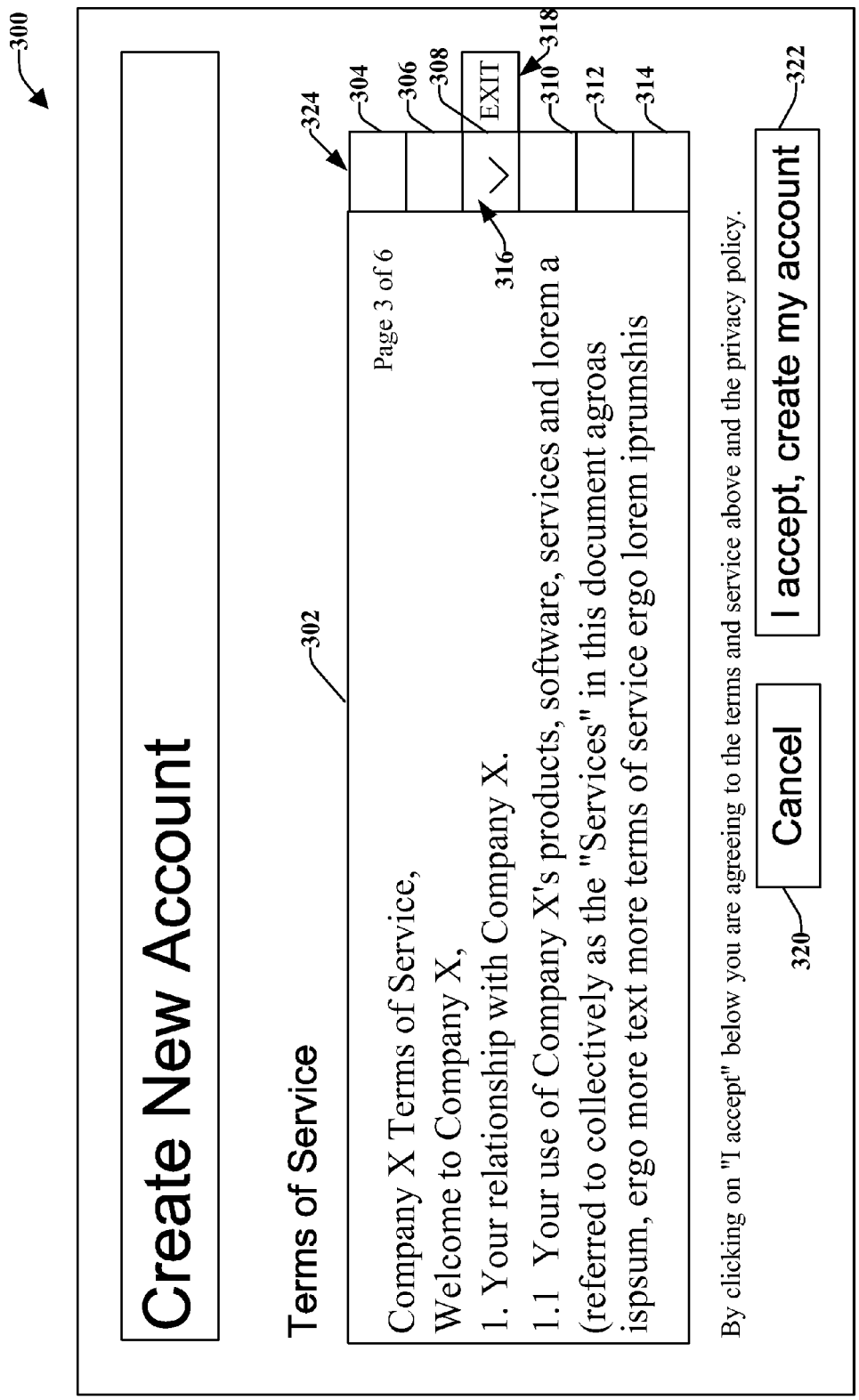
FIG. 3 illustrates a schematic representation of an example layout of a graphical interface that includes a segmented scrollbar and an escape hatch to facilitate navigating a large body of content, in accordance with various aspects and embodiments described herein.

Interface 300 further includes a scroll box 316 represented by the darkened/grayed out area box. The scroll box 316 is configured to move over the plurality of segments 304-414 to navigate through the body of text of the ToS agreement. As the scroll box 316 moves over a segment (e.g., in response to an up or down command received by input component 108 using a basic controller) the respective portion/page of the ToS agreement is displayed in the display area 302. For example, as depicted in FIG. 3, where scroll box 316 is located at segment 308, page 3 of 6 that is associated with segment 308 is displayed in the display area 302.

Interface 300 further includes an exit widget 318 attached to and/or adjacent to the scroll box 316. The exit widget 318 is configured to move with the scroll box 316. In an aspect, in order to dismiss the content being displayed in the display area (e.g., ToS page 3 of 6), rather than moving the scroll box to an end of the scrollbar (e.g., segment 314) to reach an exit option, (where the "cancel" button 320 and "I accept my account" button 322 are considered exit options), a user can move the scroll box 316 directly to the exit command widget 318 attached to the scroll box. Upon selection of the exit command widget, the content being displayed in the display area 302 can be dismissed.

Additional features and functionality of the user interfaces that interface component 104 is capable of generating are discussed in greater detail with respect to FIGS. 3-22. In general the interfaces discussed herein facilitate navigating large bodies of content using basic input commands. The type of content that can be organized and presented in an interface generated by interface component 104 can vary. In an aspect, the content can include large bodies of text such as those associated with ToS agreements. Other examples of text documents that can be organized and presented in an interface generated by interface component 104 can include but are not limited to text documents with instructions (e.g., help documents or troubleshooting manuals), registration documents, contracts, books, outlines, and scripts. In another aspect, the type of content that can be organized and presented in an interface generated by interface component 104 can include multimedia including image/picture files, video files, and sound files. Still in yet other aspects, the type of content that can be organized and presented in an interface generated by interface component 104 can include mixed media, such as documents including text, links to additional content, embedded images, embedded videos, embedded songs, etc.

The body of content data that interfacing platform 102 can organize and present using the interfaces described herein can be located at various sources. In an aspect, the content is stored in memory 112 in a content database 114. For example, content database 114 can store text documents or media libraries. In another aspect, the content can be stored at an external device associated with a media provider 120. According to this example, the data interfacing platform can communicate with the media provider via a network 122 to access the content. In yet another aspect, the content can be located at a client device 124 that is accessible to data interfacing platform via a network 122. In other aspects, data interfacing platform 102, and the content it organizes and presents using the interfaces described herein can be provided with the media provider 120 (e.g., media provider 120 can include data interfacing platform 102). According to this aspect, a client 124 can access data interfacing platform 102 at the media provider 120 via a network 122. In another example, data interfacing platform 102 can be located at a client device 124 and organize and present content stored at the client device 124 or an external device (e.g., media provider 120) accessible to the client device 124 via a network 122.

Input component 108 is configured to receive input commands for interacting with an interface generated by interface component 104, interpret the input commands and effectuate a response on the user interface based on the commands. In particular, with reference to FIG. 3, input component 108 is configured to move scroll box 316 about the segmented scrollbar 124 and other interactive items of the interface 300 (e.g., the exit widget 318, the cancel button 320, and the I accept button 322), select items on the interface (e.g., the exit widget 318, the cancel button 320, and the I accept button 322), and deselect items on the interface (e.g., where the input device includes a cancel or back button).

The input component 108 can be configured to receive and interpret input commands from various input devices. In an aspect, the input device includes a basic controller having up/down/left/right and select buttons, such as for example a television remote. According to this aspect, with reference to FIG. 3, as an example, up and down commands can move the scroll box 316 up and down the segmented scrollbar 324 from segment to segment and a right command can move the scroll box 316 to the exit widget 318. A select command can select the widget or button over which the scroll box is located. In other aspects, the input device can include a traditional mouse, a keyboard, a keypad or a touch screen.

In another aspect, the input component 108 can receive and interpret gesture commands. Gesture commands can include commands based on body movement that have been correlated to a particular input/reaction at an interface (e.g., interface 300 and other interfaces described herein) generated by data interfacing platform 102. In particular, input component 108 can interpret gestures such as certain hand signals, finger signals, arm signals, and other body movement signals, directed towards a screen or hologram at which an interface is displayed as input commands to move a scroll box/cursor about the interface and to select items on the interface.

According to this aspect, the client device 124 at which the interface is displayed or generated (e.g., when the interface is a hologram), or another device in communication with data interfacing platform 102 and/or the client device 124 (e.g., a remote, a network access node, and etc.) can include one or more sensors to facilitate gesture monitoring and interpretation. For example, gesture commands related to body position and movement can be tracked by one or more sensors at the client device 124. The tracked movement can be provided to input component 108 for interpretation of movement and correlation of the movement to an input command. The input component 108 can further effectuate the body movement based input command on the interface. In one embodiment, the gesture commands can include eye movement commands. For example, where the interface generated by data interfacing platform 102 is presented on a device worn by a user at or near the eyes (e.g., glasses) movement of the eyes including left, right, up, down, and blinking can be interpreted as commands to move a scroll box/cursor in various directions about the interface and/or to select items on the interface.

In another aspect, input component 108 is configured to track and interpret user voice commands declaring how to interact with and navigate a user interface generated by data interfacing platform. According to this aspect, the client device 124 at which the interface is displayed or generated (e.g., when the interface is a hologram), or another device in communication with data interfacing platform 102, can include a microphone for receiving speech commands. The device including the microphone can then send the audio speech commands to input component 108 for interpretation and effectuation. In an aspect, the device including the microphone can include speech analysis software for analyzing speech (e.g., converting speech to text) and providing the analyzed speech to the input component 108. In another aspect, the input component can include such speech analysis software.

Data interfacing platform 102 can be employed by various systems as a tool for generating an efficient graphical user interface to navigate and organize extensive bodies of content, regardless of type of content, with an input device having basic input controls (e.g., basic controllers to more complex input devices). By way of example, FIG. 1 presents data interfacing platform 102 for use in conjunction with a media provider 120. For example, system 100 can include one or more media providers 120 configured to provide media items, such as streaming video, streaming music, and/or streaming television to a client device via a network 122. In this respect, data interfacing platform 102 can generate an interface at a client device 124 that facilitates organizing, presenting, and consuming media items provided by the one or more media providers 120 at the client device. Data interfacing platform 102 can also generate an interface that presents and facilitates navigating other types of data provided by a media provider, such as ToS agreements in association with services of the media provider or help documents that provide instructions associated with various aspects and functionalities of the media provider 120.

In an aspect, a media provider 120 can serve as media distributer and includes a streaming component that streams media to the one or more clients 124. According to this aspect, the media can include media stored by the media provider 120 and/or stored at an external source accessible to media provider 120 via a network 122. As used in this disclosure, the terms "content consumer" or "user" refers to a person, entity, system, or combination thereof that employs system 100 (or additional systems described in this disclosure). In an aspect, a client device 124 (or additional systems/component described in this disclosure) can be configured to access a media provider 120 and receive streamed media via network 122. (e.g., the Internet). Network 122 can include but is not limited to a cellular network, a wide area network (WAD, e.g., the Internet), or a local area network (LAN). For example, a client device 124 can communicate with a media provider 120 using virtually any desired wired or wireless technology, including, for example, cellular, WAN, wireless fidelity (Wi-Fi), Wi-Max, WLAN, and etc.

A client device 124 can include any suitable computing device associated with a user and configured to interact with data interfacing platform 102 and/or a media provider 122 and configured to display an interface generated by data interfacing platform. In some aspects, a user can interface with a client device 124 using an auxiliary input device, such as a remote controller. For example, a client device 124 can include a television, a smart television, a desktop computer, a laptop computer, a cellular phone, a smart-phone, a tablet personal computer (PC), or a personal digital assistant (PDA). In an aspect, a client device 124 includes a device capable of generating a hologram of an interface generated by data interfacing platform 102 as opposed to a graphical input display on a display screen of a device. In another aspect, a client device 124 can include a device configured to be worn on or around an eye (e.g., a human eye), such as glasses or goggles. According to this aspect, the client device 124 can project an interface generated by data interfacing platform 102 onto a display area of the glasses.

Inference component 106 is configured to make various inferences and determinations regarding the placement of a scroll box over a segment of a segmented scrollbar such that a portion of a body of content is display that is most relevant to a user. For example, the inference component 106 can analyze a body of content to identify a portion of the content that is most relevant to a user based on user preferences, user context, user usage history, user associations, user context, and device context. The inference component 106 can also consider the type of content when making various inferences and determinations (e.g., the various inferences and determinations made by inference component will depend on the type of content being presented in an interface). For example, where a user has repeatedly skipped sections in text documents related to introductory matter, when presenting another text document including introductory matter, the inference component 106 can assume that the user will likely to prefer reading the document at a starting point following the introductory matter. Accordingly, the inference component 106 can place the scroll box over a segment of a segmented scrollbar associated with the starting point following the introductory matter.

In an aspect, user preferences can be predetermined and associated with a user in a user profile accessible to inference component 106 (e.g., in memory 112 or in external memory). User preferences can relate to what portions of content a user prefers over other portions of the content. For example, user preferences with respect to multimedia can relate to songs, videos, or pictures the user prefers over others. In another example, user preferences regarding multimedia can indicate that the user prefers to view multimedia that his or her friends are currently viewing and/or that is popular amongst his or her friends. In another example, user preferences regarding consuming shared text documents can indicate that the user prefers reading the summary or conclusion of documents before starting at the beginning of the document.

In other aspects, user preferences can be determined/inferred by inference component based on user usage history, user demographics, user social circle affiliations and other extrinsic data. According to this aspect, preference detection component 202 discussed infra, can facilitate inference component 106 in determining and inferring user preferences to employ when determining or inferring a portion of content to display in an interface based on the user preferences.

In addition to user preferences, inference component 106 can determine or infer a portion of content deemed most relevant to a user based on user context and or user device context. User device context includes but is not limited to a technical or physical state of the user device hardware or software. For example, user device context can relate to current operations of a program or application running on a client device 124. In another example, user device context can relate hardware states of a client device that are recognized by a program or application running on the client device. This type of user device context data can facilitate identifying portions of diagnostic data or help/instruction type content to refer a user to in a user interface displaying the diagnostic data or help/instruction data. User context can relate to a virtual context of a user with respect to a program or application running on a client device. For example, user context can relate to what other users, including friends of the user, are viewing/consuming/doing in association with the content provided in an interface generated by data interfacing platform. User context can also relate to time (e.g., time of day, day of week), external events associated with a point in time that can affect user decisions regarding content, or progression though an application or other data related to the content displayed in an interface generated by data interfacing platform 102. For example, where a user is playing a video game and has completed levels 1-3 and interface presents an instruction manual with tips on different levels, the inference component can infer that based on a user context of completion of levels 1-3, the portion of the instruction manual that is most relevant is the portion relating to level 4. Accordingly, the interface component 104 can place a scroll box of a segmented scrollbar over the segment associated with the portion of the of the instruction manual relating to level 4.

In an aspect, inference component 106 can employ context component 204 to facilitate determining device context and user context in association with employing device context and user context when inferring or determining a portion of a body of content to display (e.g., to place the scroll box at) in a user interface. Context component 204 is discussed in greater detail infra with respect to FIG. 2.

Inference component 106 can employ one or more algorithms and look-up tables stored in memory 112 to facilitate making various determinations and inferences regarding inferring/determining user preferences, user context and/or device context to facilitate ultimately inferring/determining a portion of a body of content to display (e.g., to place the scroll box at) in a user interface. Such algorithms and/or look-up tables can define various relationships between user preferences, user context, and device context with specific portions of various types of content. In order to provide for or aid in the numerous inferences described in this disclosure, inference component 106 can examine the entirety or a subset of data to which it is granted access in order to provide for reasoning about event management and planning decisions. Inference component 106 can be granted access to any information associated with system 100 (and additional system described herein), including information received or generated by system 100, information stored in memory 112, as well as accessible extrinsic information accessible to data interfacing platform 102 via a network 122.

Inference component 106 can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, $x=(x1, x2, x3, x4, xn)$, to a confidence that the input belongs to a class, such as by $f(x)=confidence(class)$. Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 2:
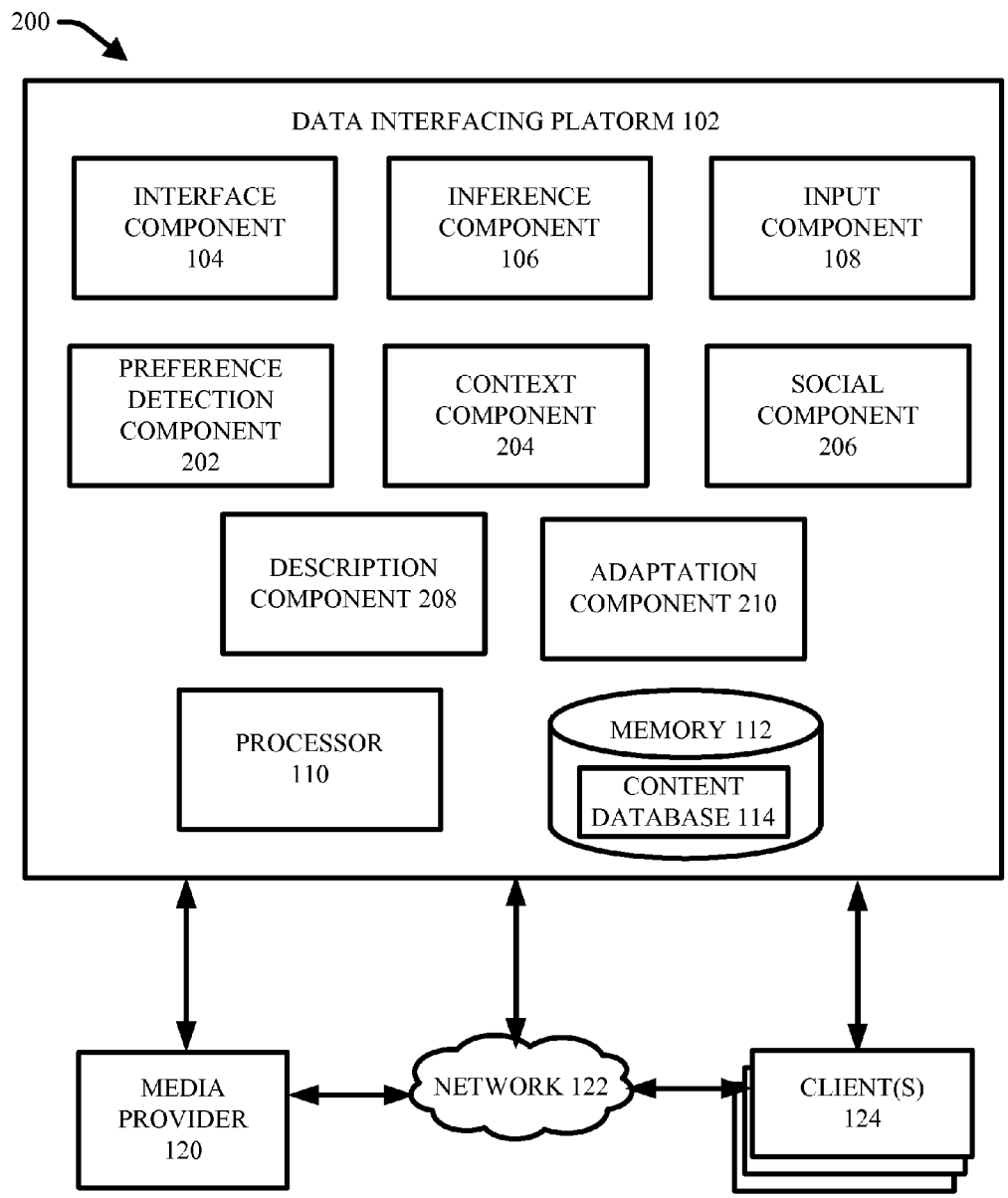
FIG. 2 illustrates a block diagram of another example system that facilitates navigating large bodies of content using a graphical interface having a segmented scrollbar and an escape hatch in accordance with various aspects and embodiments described herein.

FIG. 2 presents a system 200 having a data interfacing platform 102 that facilitates navigating large bodies of content provided on a device without a traditional keyboard or keypad input device in accordance with another embodiment. In addition to the various components discussed with respect to system 100, system 200 can include preference detection component 202, context component 204, social component 206, description component 208 and adaptation component 210. Repetitive description of like elements employed in respective embodiments of systems and interfaces described herein are omitted for sake of brevity.

Preference detection component 202 is configured to determine or infer user preferences based on provided or data gathered about a user. The inference component 106 can then employ the user preference information to determine or infer a particular portion of a body of content that is most relevant or interesting to the user. In some aspects, preference detection component 202 can be provided with some information about a user, such as the user's age, demographic, location or occupation. The preference detection component 202 can in turn determine or infer user preferences based on the provided information. For example, the preference detection component 202 can employ various algorithms and/or look-up tables that relate the provided information to user preferences regarding how to consume a text document, knowledge regarding particular subject matter, or preferences regarding multimedia (e.g., likes and dislikes in music, videos, images, etc.).

In other aspects, the preference detection component 202 can employ aggregated user information to determine or infer user preferences. For example, the preference detection component 202 can group users with similar statistics, demographics, interests, and etc., and evaluate preferences of the group to infer or determine preferences of a particular user associated with the group.

In additional aspects, the preference detection component 202 can gather historical data related to a user's interaction with content displayed in interfaces generated by interfacing platform. For example, the preference detection component 202 can observe user patterns regarding interaction with a user interface, what content the user generally likes based on a declared liking or monitored selections, what content the user generally dislikes or doesn't select or dismisses, what content the user generally skips to in a text document, etc. The preference detection component 202 can then formulate user preferences with respect to certain kinds of content based on such historical patterns.

Context component 204 is configured to determine or infer user device 124 context information. The inference component 106 can then employ the user device context information to determine or infer a particular portion of a body of content that is most relevant or interesting to the user. As noted above, device context includes but is not limited to a technical or physical state of the user device hardware or software. For example, user device context can relate to current operations of a program or application running on a client device 124. According to this example, the context component 204 can identify problems associated with a particular application running on a client device 124. For instance, context component 204 can identify when a media player is experiencing issues with playback and pinpoint a particular issue such as an issue with sound quality or image contrast.

In another example, user device context can relate to hardware states of a client device 124 that are recognized by a program or application running on the client device. Context component 204 is configured to employ diagnostic and/or sensory tools to monitor states of a client device 124 and/or states of an application running on a client device 124. The context component 204 can further infer or determine when the state of the client device or application of the client device relates to content associated with an interface generated by data interfacing platform 102. The inference component 106 can then identify a portion of the content that is most relevant or interesting to a user based on the context information. In some aspects, the context component 204 can further determine/infer contextual information including but not limited to: a location of a client device 124, time of day, or the multiple operations running on a client device 124.

Social component 206 is configured to identify and share user activity information regarding content presented in an interface generated by data interfacing platform 102. In particular, social component 206 can identify what users are viewing/consuming or otherwise interacting with content displayed on an interface generated by interface component 104. According to this aspect, content presented in an interface generated by data interfacing platform 102 can include shared content that can be consumed by two or more users at the same time or substantially same time or at different times.

The social component 206 can further identify specific portions of a body of content that other users are currently viewing/consuming or otherwise interacting with or have previously viewed, consumed or otherwise interacted with. The social component 206 can provide this information to the interface component 104 and the interface component 104 can employ the information to identify the multiple users within a generated interface at the respective segments of a segmented scrollbar corresponding to the portions of the content the users are associated with.

For example, the interface component 104 can attach an icon to a segment of a segmented scrollbar identifying a user that is currently viewing/consuming the portion of the body of content organized and presented by an interface that is associated with the segment. In an aspect, the icon can include a face of a user, a name of a user, or other symbol identifying the user. Accordingly, a user can be presented with an interface that indicates what other users have viewed and/or are currently viewing a particular portion of a shared body of content merely be glancing at the segmented scrollbar. In another example, the interface component 104 can generate additional windows or secondary display areas on an interface that identifies other users who have viewed or are currently viewing a portion of a shared document displayed on the interface.

Description component 208 is configured to generate descriptions for segments of a segmented scrollbar based in part on the content associated therewith. For example, when a body of content is broken into a plurality of portions, each of the segments of a segmented scrollbar can include generic descriptors such as portion 1, portion 2, portion 3, portion 4, and etc., or page 1, page 2, page 3, page 4 and etc., or image 1, image 2, image 3, and etc. The description component 208 is configured to analyze a portion of content associated with a segment and generate a more descriptive title for the segment. For example, the description component 208 can identify the title of a video or song associated with a segment and employ the title of the as the descriptor for the segment.

In an aspect, the description component 208 can further determine or infer a descriptor to provide on a segment based on user preferences and/or device context. For example, where a user is under the age of 6, the description component 208 can use simple words or pictures as descriptors for segments. In another example, the description component 208 can use highly technical descriptors, such as symbols or acronyms known to a skilled person of a particular trade when the user is a skilled person of the particular trade. For the same body of content and associated segments, the description component 208 can provide more general descriptors for a person who belong to a different, less technical trade. According to this aspect, the description component 208 can dynamically change descriptors for segments associated with respective content based on preferences and/or demographics of a user. Such preference or demographic information can be provided to data interfacing platform by the user and/or generated by preference detection component 202.

Adaptation component 210 can be employed by interface component 104 to facilitate tailoring of graphical interfaces generated thereby to a client device 124 at which the graphical interface is displayed. As noted above, a client device 124 can include any suitable device associated with a user and configured to present a graphical interface generated by data interfacing platform 102. For example, a client device can include a television, a desktop computer, a laptop computer, a smart-phone, a tablet PC, a PDA, or a device configured to generate a graphical display as a virtual hologram. Adaptation component 210 is configured to tailor the design and presentation of an interface generated by the interface component 104 based at least in part on capabilities and functionalities of the user device 124 at which the interface is displayed.

Respective devices often have different capabilities and limitations (e.g., screen size, decoders . . . ). In an aspect, the adaptation component 210 can provide presentation options in accordance with different device capabilities or limitations. For example, data rendering capabilities may be more limited in a mobile device (e.g., a smart-phone) than in a fixed computing device (e.g., a desktop computer) and more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. The adaptation component 210 can thus optimize display of options and content for respective devices.

FIGS. 3-22 present various graphical user interfaces capable of being generated by data interfacing platform 102 in accordance with various aspects and embodiments disclosed herein. However, it should be appreciated that data interfacing platform 102 can be used for generating character input interfaces with various types of systems that require character input. Repetitive description of like elements employed in respective embodiments of systems and interfaces described herein are omitted for sake of brevity.

Turning now to FIGS. 3-6, presented are example graphical user interfaces generated by interfacing platform 102 that facilitate presenting and navigating large bodies of text content, such as a ToS agreement, in accordance with a first embodiment.

FIG. 3 presents an interface 300 displaying a ToS agreement. As described above includes a display area 302 in which the ToS agreement is presented. The ToS can include several pages of text where only one portion or page of the text can be displayed at a time in the display area 302. The interface 300 further includes a scrollbar 324 that has a plurality of segments 304-314. Each of the plurality of segments 304-314 are associated with respective portions of the body of text of the ToS. Interface 300 further includes a scroll box 316 represented by the darkened/grayed out area box. The scroll box 316 is configured to move over the plurality of segments 304-414 to navigate through the body of text of the ToS agreement. As the scroll box 316 moves over a segment the respective portion/page of the ToS agreement is displayed in the display area 302.

Interface 300 further includes an exit widget 318 attached to and/or adjacent to the scroll box 316. The exit widget 318 is configured to move with the scroll box 316. In an aspect, in order to dismiss the content being displayed in the display area (e.g., ToS page 3 of 6), rather than moving the scroll box to an end of the scrollbar (e.g., segment 314) to reach an exit option, (where the "cancel" button 320 and "I accept my account" button 322 are considered exit options), a user can move the scroll box 316 directly to the exit command widget 318 attached to the scroll box. In an aspect, upon selection of the exit command widget, the content being displayed in the display area 302 can be dismissed. In another aspect, upon selection of the exit command widget 318, the scroll box 316 can move to and activate another widget of the user interface 300 such as the cancel button 320 or the "I accept and create my account" button.

In an aspect, when interface 300 was first presented to a user, the scroll box 316 was located at the first segment 304. In order to arrive at segment 308 at which the scroll box 316 is depicted in interface 300, a user entered an input command to move the scroll box 316 down to segment 308. For example, when using a controller having up/down/left/right and enter buttons, the user could have pressed the down button twice to move the scroll box segment. In another example, where the user device at which interface 300 is display includes gesture recognition or voice recognition input capabilities, the user could motion a gesture to move the scroll box down to segment 308 or speech a command to move the scroll box down to segment 308. An input component (e.g., input component 108) can further interpret received input commands to effectuate the commands on the interface 300.

In another aspect, interface 300 is initially presented to a user with the scroll box 316 located at segment 308 as opposed to segment 304 at the top of the scroll bar. According to this aspect, the scroll box can be located at segment 308 based on a determination or inference by inference component 106 that segment 308 corresponds to a portion of the ToS agreement that is most relevant to the user or most desired by the user. For example, the inference component 106 could determine that other users often fail to read section 1.1 of the ToS and later raise concern with Company X regarding section 1.1. Inference component 106 can then infer that the user interfacing with interface 300 will likely wished they had read section 1.1 in the future if they hadn't in the past. Inference component 106 can thus inform the interface component 104 to place the scroll box over segment 308 so that section 1.1 is presented to the user. In another example, inference component 106 can determine that based on a role, title, or membership contract associated with the user interfacing with interface 300, portions of the ToS that are associated with segments 304 and 306 do not apply to the user while the portion of the ToS associated with segment 308 does apply to the user. Thus the inference component 106 can inform the interface component 104 to locate the scroll box 316 at segment 304.

Figure 4:
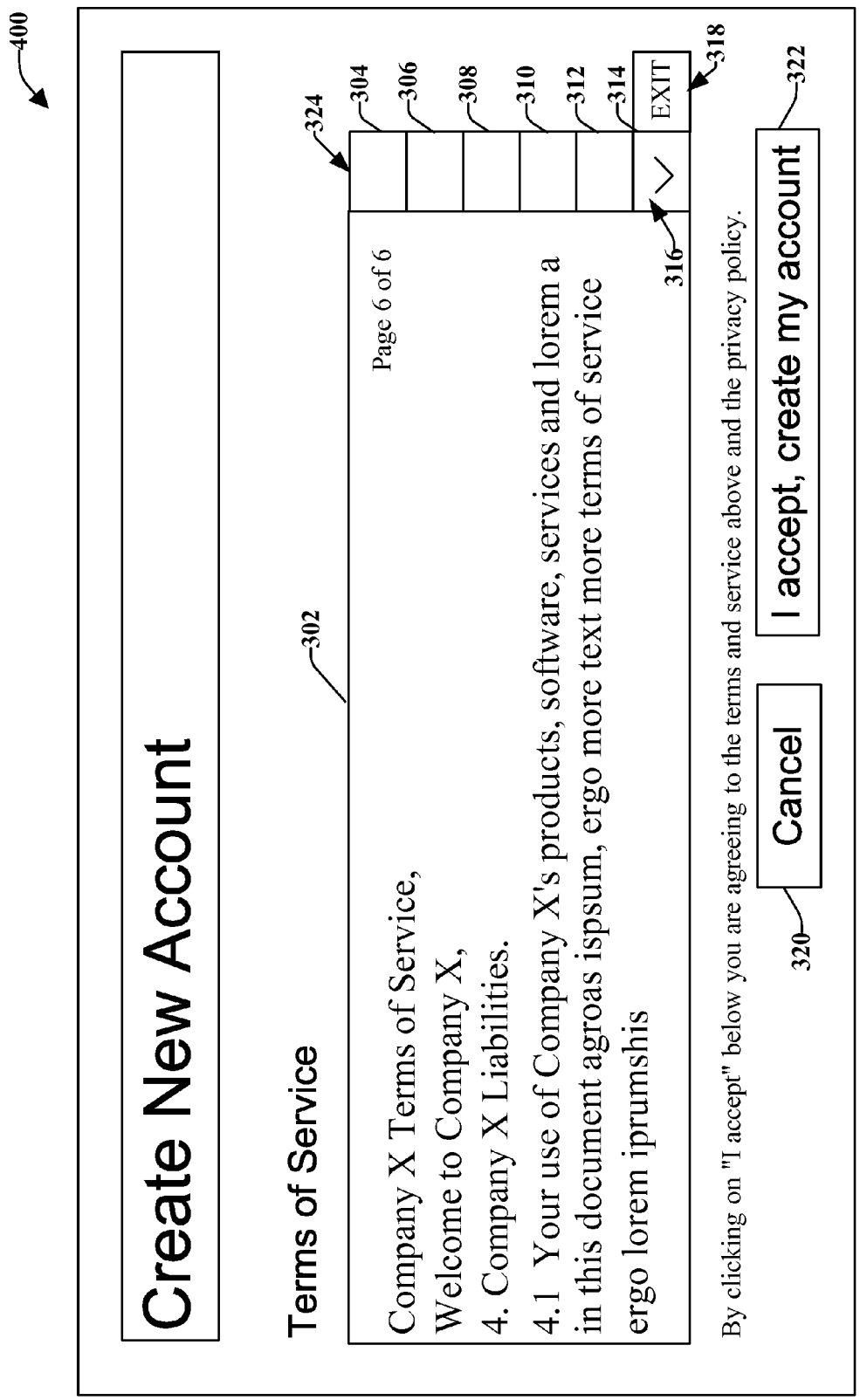
FIG. 4 illustrates a schematic representation of another example layout of a graphical interface that includes a segmented scrollbar and an escape hatch to facilitate navigating a large body of content, in accordance with various aspects and embodiments described herein.

FIG. 4 presents an interface 400. Interface 400 is an extension of interface 300 and displays another portion of the ToS agreement of interface 300 in response to movement of the scroll box 316 from segment 308 to segment 314 (e.g., using the various input mechanisms discussed herein). As seen in FIG. 4, the text of the ToS agreement in the display area now corresponds to the text associated with segment 314. That is segment 314 corresponds to page 6 of 6 of the ToS agreement where 4. Company X Liabilities are described. Also as seen in interface 400, the exit command widget 318 has moved with the scroll box 316 such that the exit command widget 318 remains adjacent to the scroll box 316.

Figure 5:
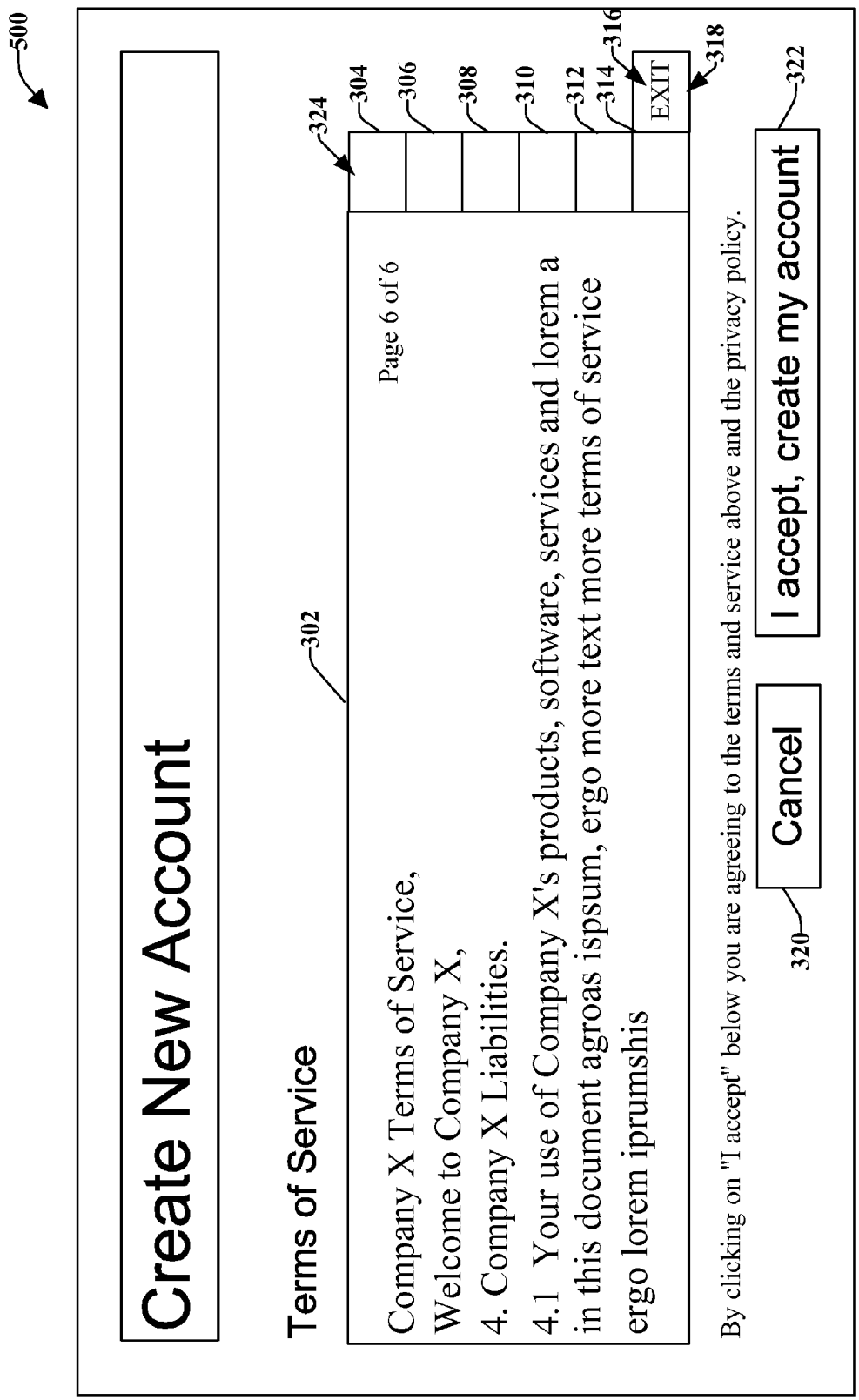
FIG. 5 illustrates a schematic representation of another example layout of a graphical interface that includes a segmented scrollbar and an escape hatch to facilitate navigating a large body of content, in accordance with various aspects and embodiments described herein.

FIG. 5 presents an interface 500. Interface 500 is an extension of interface 400 in which the scroll box 316 of interface 400 is moved to the exit command widget 318 as represented by the darkening of the exit command widget 318. In an aspect, in order to move the scroll box 316 from segment 314 to the exit command widget, a user can press a right direction button on controller.

Figure 6:
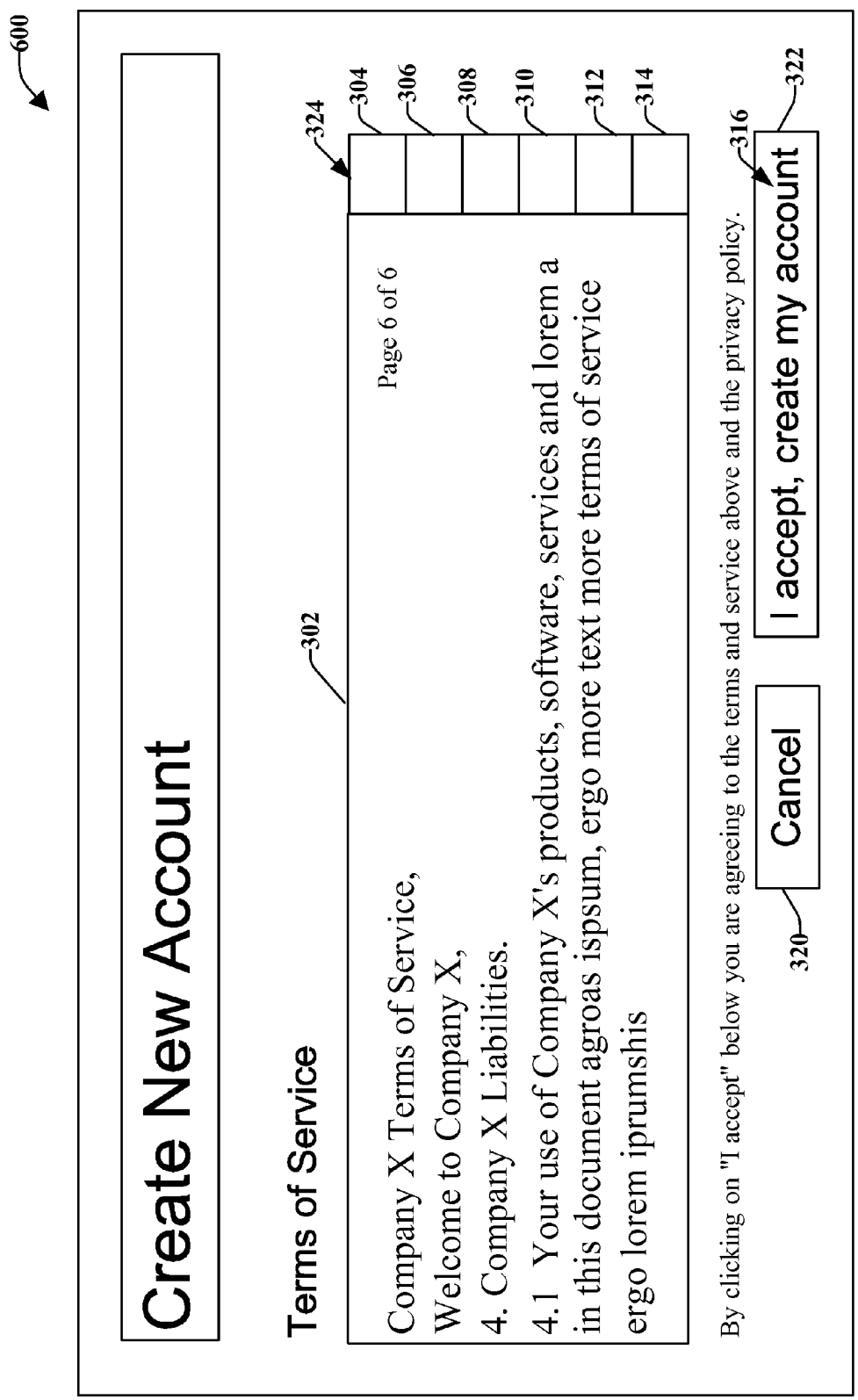
FIG. 6 illustrates a schematic representation of another example layout of a graphical interface that includes a segmented scrollbar and an escape hatch to facilitate navigating a large body of content, in accordance with various aspects and embodiments described herein.

FIG. 6 presents an interface 600. Interface 600 is an extension of interface 500 in which the scroll box 316 of interface 500 is moved to the "I accept and create my account" button 322 as represented by the darkening of the "I accept and create my account" button 322. In an aspect, in order to move the scroll box 316 from the exit command widget 318 to the "I accept and create my account," a user can select the exit command widget 318 of interface 400. In fact, in various aspects, in order to move to the scroll box 316 to the "I accept and create my account," button, the user can select the exit command widget 318 regardless of what segment 304-314 the scroll box is located. This is because the exit command widget 318 is configured to remain attached or move with the scroll box as the scroll box moves about the scroll bar 324.

It should be appreciated that interfaces 300-600 are shown with a text document that is six pages with a corresponding segmented scrollbar having six segments corresponding to each page of the six page document merely for exemplary purposes. For example, interface component can generate a similar interface for a document having any number of pages N. Further, interface component 104 can generate a scrollbar having any number M of segments, where N and M can be same or different numbers. Thus a segment of a segmented scrollbar does not necessarily need to correspond to a sequential page of a document. Further, it should be appreciated that the size and number of segments displayed on a scrollbar 324 can vary. For example, although scrollbar 324 displays six segments, scrollbar 324 can display one or more segments at a time where additional segments are displayed by scrolling up or down the scrollbar.

Figure 7:
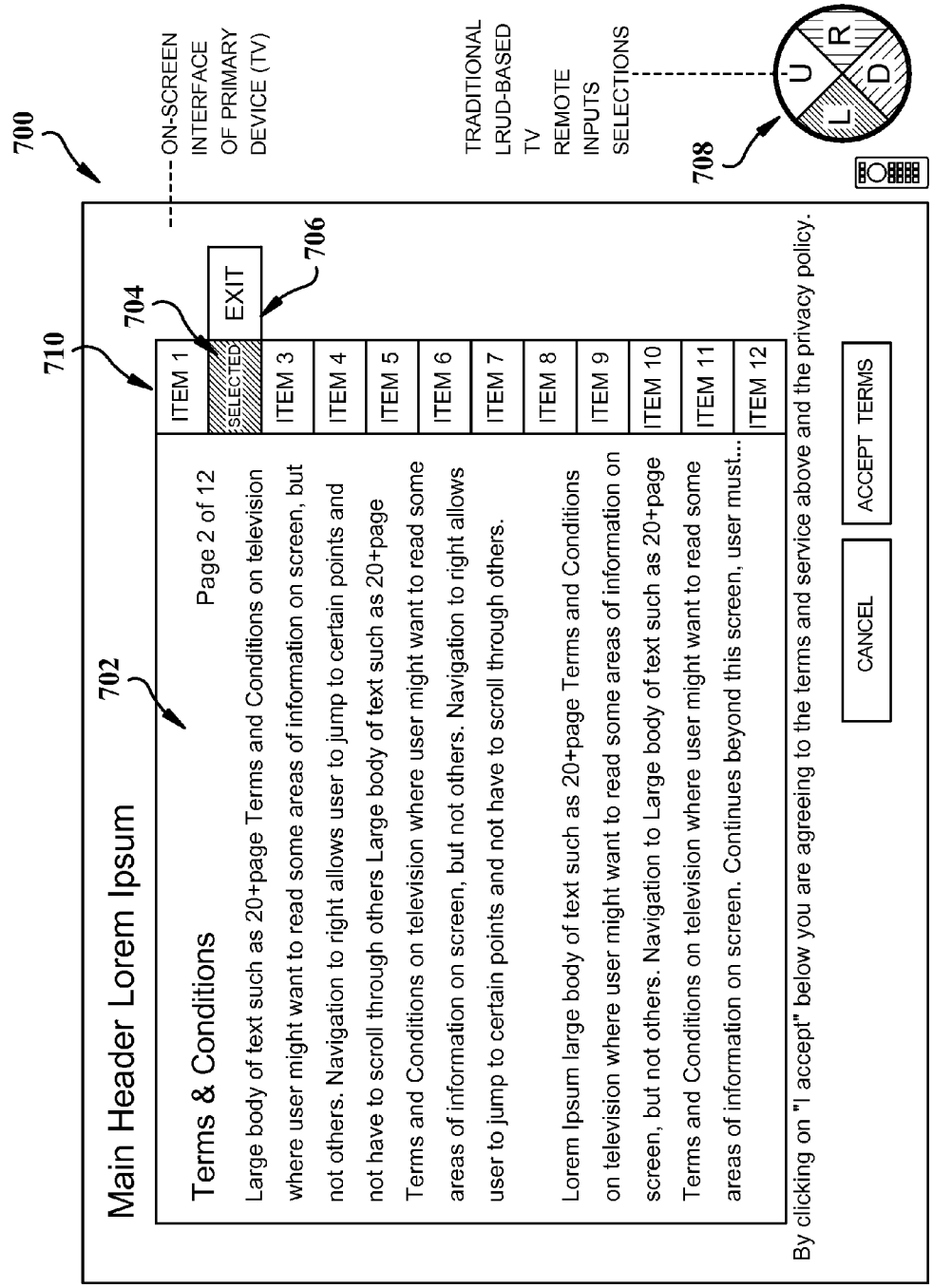
FIG. 7 illustrates a schematic representation of another example layout of a graphical interface that includes a segmented scrollbar and an escape hatch to facilitate navigating a large body of content, in accordance with various aspects and embodiments described herein.

Referring now to FIG. 7, presented is another example interface generated by interface component 104 that facilitates presenting and navigating large bodies of text content, such as a ToS agreement, in accordance with a second embodiment.

Interface 700 includes a display area 702 in which portions of a ToS agreement corresponding to segments of the segmented scrollbar 710 are presented. Interface 700 further includes a scroll box 704 depicted as the darkened area over item 2 where the words "selected" are typed. In an aspect, when the scroll box is positioned over a segment of the segmented scrollbar 710, the segment is highlighted and the words "selected" are located in the scroll box. Interface 700 further includes an exit widget 706 attached to the scroll box 704. Interface 700 is similar to interfaces 300-600 with the addition of titles (e.g., item 1, item 2, item 3, item 4 and etc.) to the segments of the segmented scrollbar. In addition, the segmented scrollbar of interface 700 includes twelve segments that are respectively associated with pages 1-12 of the ToS agreement.

As with interfaces 300-700, the interface component 104 can locate the scroll box 704 at a segment of the segmented scrollbar 710 that is associated with a portion of the ToS that was inferred or determined to be relevant or of particular interest to a user using inference component 106 in the various manners discussed herein. For example, inference component 106 can determine that the user interfacing with interface 700 would not be interested in reading Item 1 and thus skip to Item 2 initially by locating the scroll box 704 at Item 2 as displayed in FIG. 7. In an aspect, interface 700 is presented on a television. A user can interact with interface 700 using a traditional LRUD remote 708 and/or another input mechanism discussed herein. LRUD remote 708 is depicted with at least four input buttons, U for up, R for right, D for down and L for left. It should be appreciated that the LRUD remote 708 can include additional buttons such as "select," "back," and "cancel."

Figure 8:
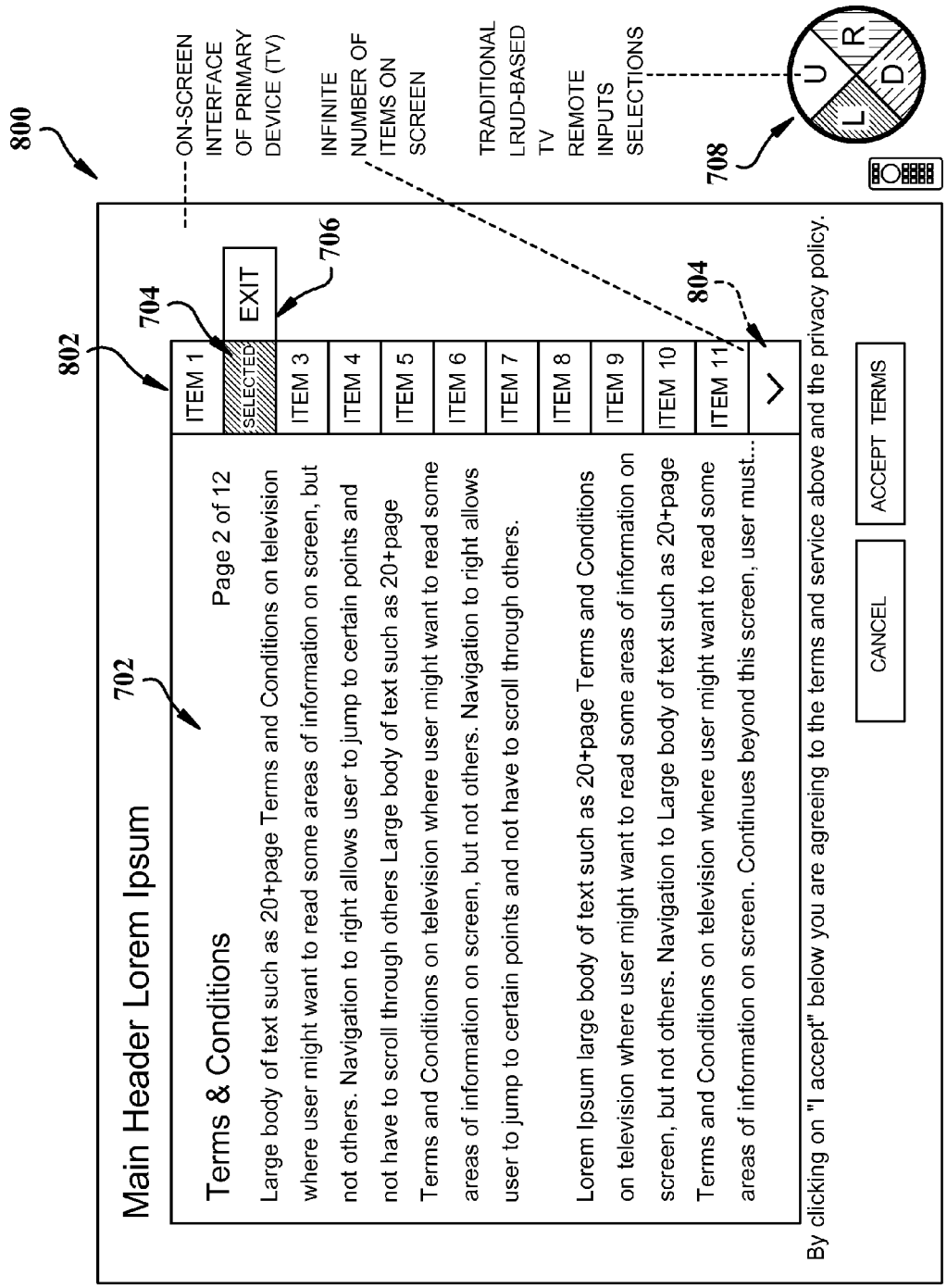
FIG. 8 illustrates a schematic representation of another example layout of a graphical interface that includes a segmented scrollbar and an escape hatch to facilitate navigating a large body of content, in accordance with various aspects and embodiments described herein.

FIG. 8 presents an example interface 800 generated by interface component 104 that facilitates presenting and navigating large bodies of text content, such as a ToS agreement, in accordance with a third embodiment. Interface 800 can include one or more of the various features of interface 700 with the exception of the non-fixed segmented scrollbar 802. For example, with reference back to FIG. 7, scrollbar 710 includes a fixed number of segments (e.g., twelve segments). In other words, scrollbar 710 is a fixed segmented scrollbar. On the contrary, as seen in interface 800, segmented scrollbar 802 includes eleven segments, represented by Items 1-11, and a down arrow 804. By moving the scroll box 704 to the down arrow, additional segments of the segmented scrollbar can be revealed while previously displayed segments (e.g., beginning with Item 1 and so on) of the segmented scrollbar can be hidden. According to this aspect, a non-fixed segmented scrollbar, such as scrollbar 802 can include an number P of segments.

Figure 9:
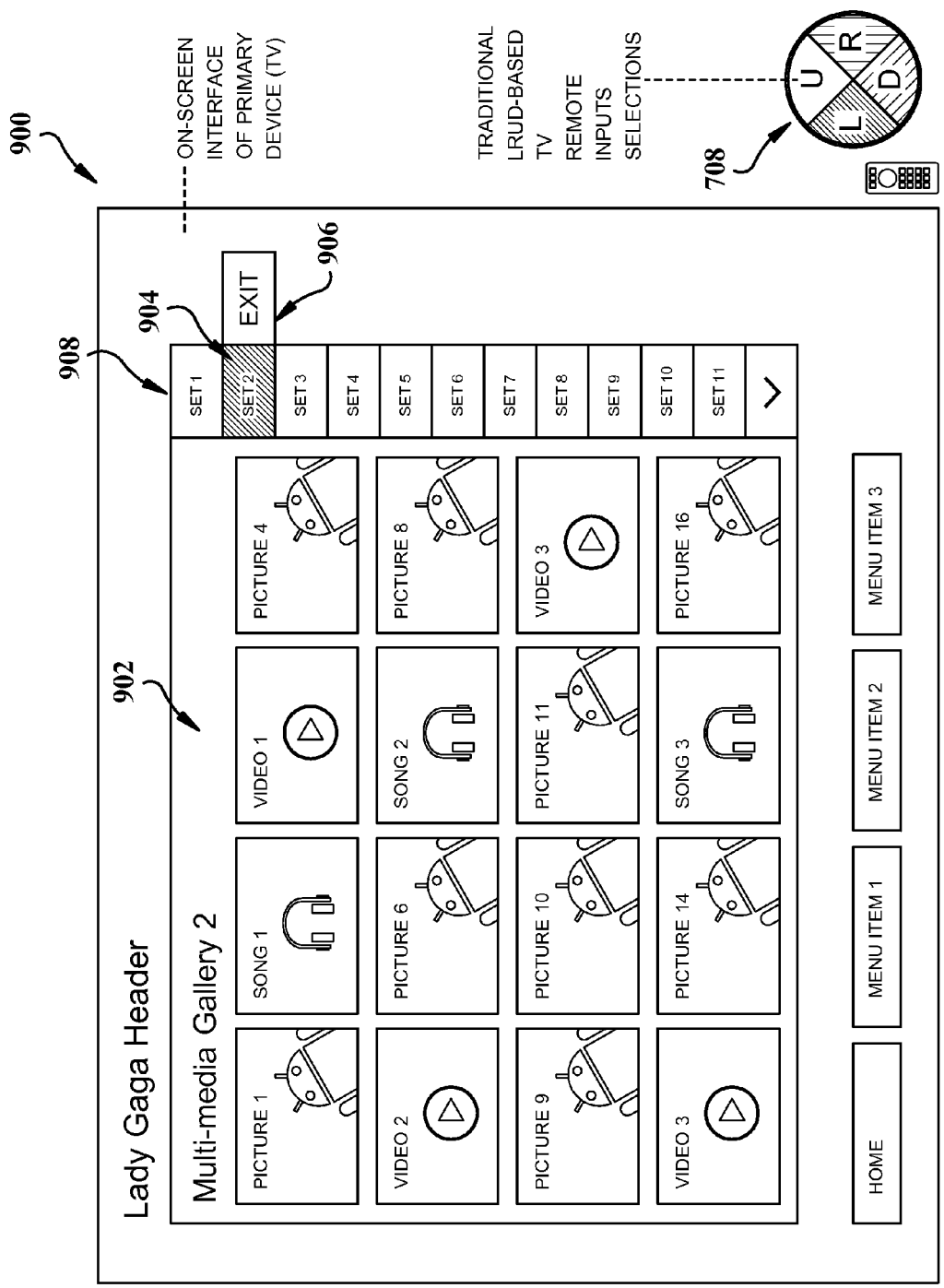
FIG. 9 illustrates a schematic representation of another example layout of a graphical interface that includes a segmented scrollbar and an escape hatch to facilitate navigating a large body of content, in accordance with various aspects and embodiments described herein.

FIG. 9, presents another example interface 900 generated by interface component 104 that facilitates presenting and navigating large bodies of content, such as mixed media, in accordance with a fourth embodiment. Similar to the previously described interfaces, interface 900 includes a display area 902. However, rather than displaying a portion of a text document in the display area, interface 900 displays a set of mixed media from a media library. For example, interface 900 can facilitate organizing and navigating a large media library with numerous media files organized into a plurality of sets (groups, galleries, playlists, etc.). Each of the sets of the media library can be associated with a respective segment of a non-fixed segmented scrollbar 908. For example, segmented scrollbar 908 includes a non-fixed segmented scrollbar displaying eleven sets where each set is associated with a multi-media gallery that includes various pictures, songs, and/or videos. For instance, set 2 at which a scroll box 904 is located is associated with multi-media gallery 2. Multi-media gallery 2 includes a mixture of pictures, songs, and videos. In an aspects, as seen in FIG. 9, the media of a set (e.g. the various pictures, songs, and/or videos), can be presented in the display area as thumbnails.

Interface 900 includes a scroll box 904 configured to move up and down the scroll bar 908 in response to the various input command mechanisms discussed herein. Interface 900 also includes an exit widget 906 configured to move with the scroll box. As with interfaces 300-800, in an aspect, the interface component 104 can locate the scroll box 904 at a segment (e.g., segment set 1, segment set 2, segment set 3 and so on) of the segmented scrollbar 910 that is associated with a set or multi-media gallery of a user library that is determined or inferred to be relevant or of particular interest to a user using inference component 106 in the various manners discussed herein. For example, inference component 106 can determine that the user interfacing with interface 900 would be interested in viewing multi-media gallery 2 based on various preference of the user. Thus the inference component 106 can direct the interface component 104 to locate the scroll box 904 over segment titled "Set 2," that is tied to multimedia gallery 2.

In an aspect, interface 900 is presented on a television. A user can interact with interface 900 using a traditional LRUD remote 708 and/or another input mechanism discussed herein (e.g. gesture commands, voice commands, a mouse or keyboard, and etc.).

Figure 10:
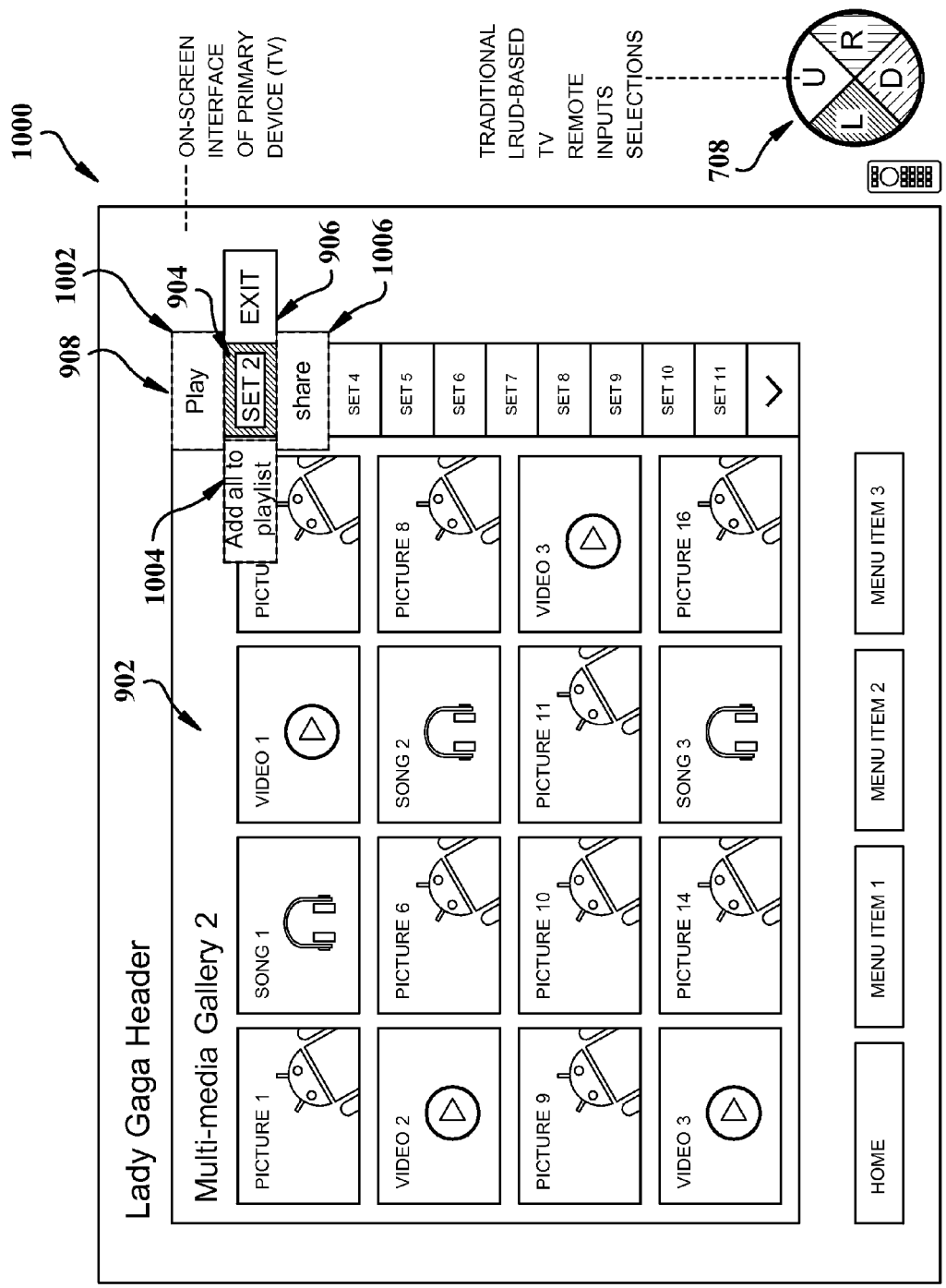
FIG. 10 illustrates a schematic representation of another example layout of a graphical interface that includes a segmented scrollbar and an escape hatch to facilitate navigating a large body of content, in accordance with various aspects and embodiments described herein.

FIG. 10 presents an example interface 1000 generated by interface component 104 that facilitates presenting and navigating large bodies of content, such as mixed media, in accordance with a fifth embodiment. Interface 1000 can include one or more of the various features of interface 900 with the addition of one or more additional control function widgets to scroll box 904. In particular, in addition to the exit command widget 906, interface component 104 is configured to generate one or more additional command widgets and attach the command widgets to the scroll box. The additional command widgets can move with the scroll box or be dismissed as the scroll box moves from segment to segment.

For example as seen in FIG. 10, scroll box 904 includes exit widget 906, share widget 1006, "add all to playlist" widget 1004, and play widget 1002. The additional widgets can further be arranged around and adjacent to sides of the scroll box 904. In an aspect, when using LURD control 708, a user can move the scroll box up/down/left and right to select one or more of the additional control widgets. The exit widget can function as previously described. The play widget 1002 can cause a song or video to play. The add all to playlist widget 1004 can cause all the items of multimedia gallery 2 to be added to a playlist. The share widget can cause one or more items of multimedia gallery to be shared with another user (e.g., by publishing a link to the one or more items, sending an email with a link to the one or more items to another user, and etc.).

In an aspect, the interface component 104 can dynamically generate and attach additional command widgets to a scroll box as a function of the content associated with the segment over which the scroll box is located. For example, if the content is a video or song, the interface component 104 can generate control widgets that allow a user to play the video or song. However, where the content is a still image, such a "play" widget would not be applicable. Accordingly, the interface component would not generate a "play" widget for a still image. It should be appreciated that a variety of different command widgets can be generated and applied to a scroll box in addition to those mentioned herein. Such command widgets can vary and expend depending on various features associated with a system providing the content organized and displayed by an interface generated by data interfacing platform 902.

Figure 11:
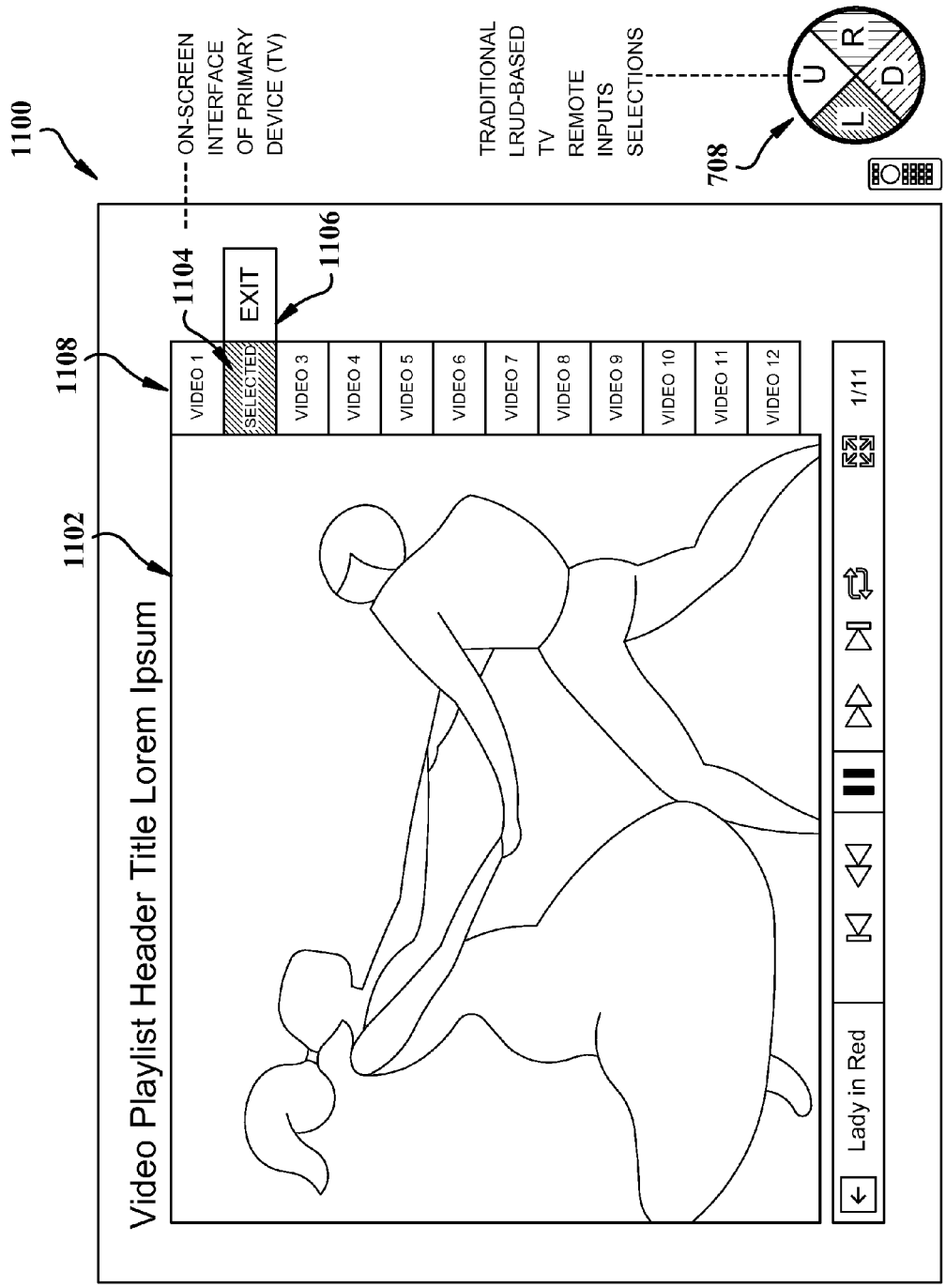
FIG. 11 illustrates a schematic representation of another example layout of a graphical interface that includes a segmented scrollbar and an escape hatch to facilitate navigating a large body of content, in accordance with various aspects and embodiments described herein.

FIG. 11, presents another example interface 1100 generated by interface component 104 that facilitates presenting and navigating large bodies of content, such as videos, in accordance with a sixth embodiment. Similar to the previously described interfaces, interface 1100 includes a display area 1102 a segmented scrollbar 1108, a scroll box 1104 and an exit widget 1106. Scroll box 1104 is configured to move about the scroll bar 1108 to select one of the items (e.g., videos) of the segmented scroll bar. Similarly to other interfaces, the user can easily move to the exit button to dismiss the content (e.g., video) being displayed in the display area 1102 and/or activate another icon of the interface 1102.

However, rather than displaying a portion of a text document or mixed media thumbnails in the display area, interface 1100 displays selected videos. For example, interface 1100 can facilitate organizing and navigating a media library or playlist with numerous video files. Each of the videos can be associated with a segment of a segmented scroll bar 1108. For example, video 1 can be associated with a video for the song "Ribbon Dancer," video 2 can be associated with the video for "Lady in Red," and so on. In an aspect, the segments of segmented scrollbar 1108 can include descriptors (e.g., that state the title and/or artist) for the video which they respectively represent. Interface 1100 has a fixed segmented scroll bar 1108 with twelve segments merely for exemplary purpose.

In an aspect, as with the other interfaces, the scroll box 1104 can initially be provided by default at the top of the scrollbar 1108. However, in other aspects, the interface component 104 can intelligently infer/determine a video that is most relevant or desirable to a user (using the inference component 106). The interface component 104 can further place the scroll box 1104 at the video segment of the segmented scrollbar 1108 corresponding to the inferred/determined video. Also, as with the other interfaces, interface 1100 can be projected on various user devices (e.g., a television) and interacted with using various input devices and mechanisms described herein, including an LRUD based television remote 708.

Figure 12:
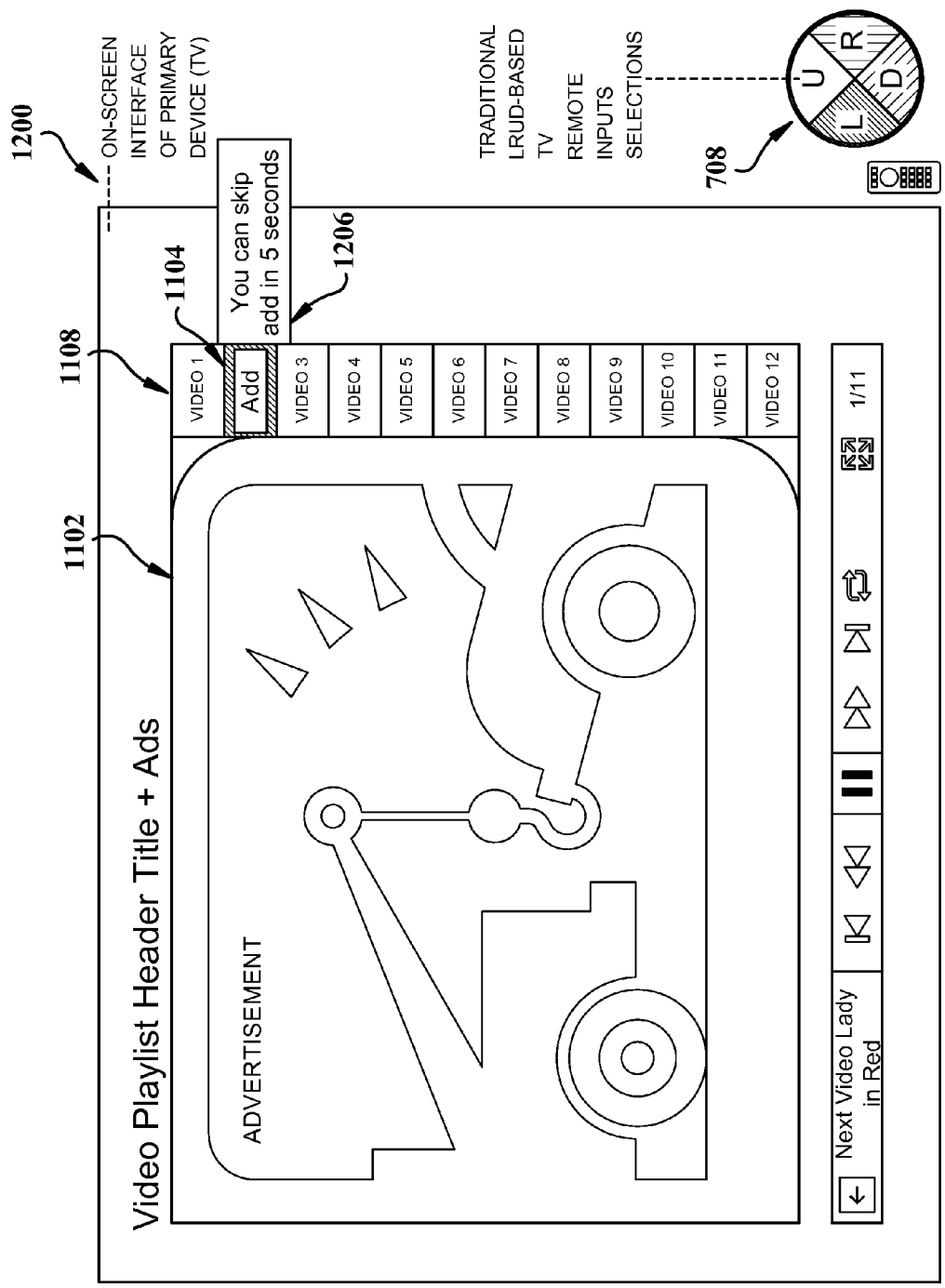
FIG. 12 illustrates a schematic representation of another example layout of a graphical interface that includes a segmented scrollbar and an escape hatch to facilitate navigating a large body of content, in accordance with various aspects and embodiments described herein.

FIG. 12 presents an example interface 1200 generated by interface component 104 that facilitates presenting and navigating large bodies of content, such video files, in accordance with the sixth embodiment. Interface 1200 can include one or more of the various features of interface 1100 with the addition of a modification to the scroll box 1104 to accommodate adds. In particular, in some aspects, the video content represented by a video segment of segmented scrollbar 1108 can include an advertisement (add) embedded with or otherwise associated with the video content. According to this aspect, when video content includes an add, the add can be displayed in the display area 1102 and the scroll box 1104 can adapt to include a descriptor that indicates an add is playing. Also according to this aspect, rather than presenting an exit widget aside the scroll box, the interface component 104 can generate a widget 1206 that allows a user to select the widget to skip the add 1206 after a predetermined period of time has passed (e.g., 5 seconds). In some aspects, the widget 1206 can include a countdown function that displays the number of seconds remaining before a user can select the icon to skip the add.

Figure 13:
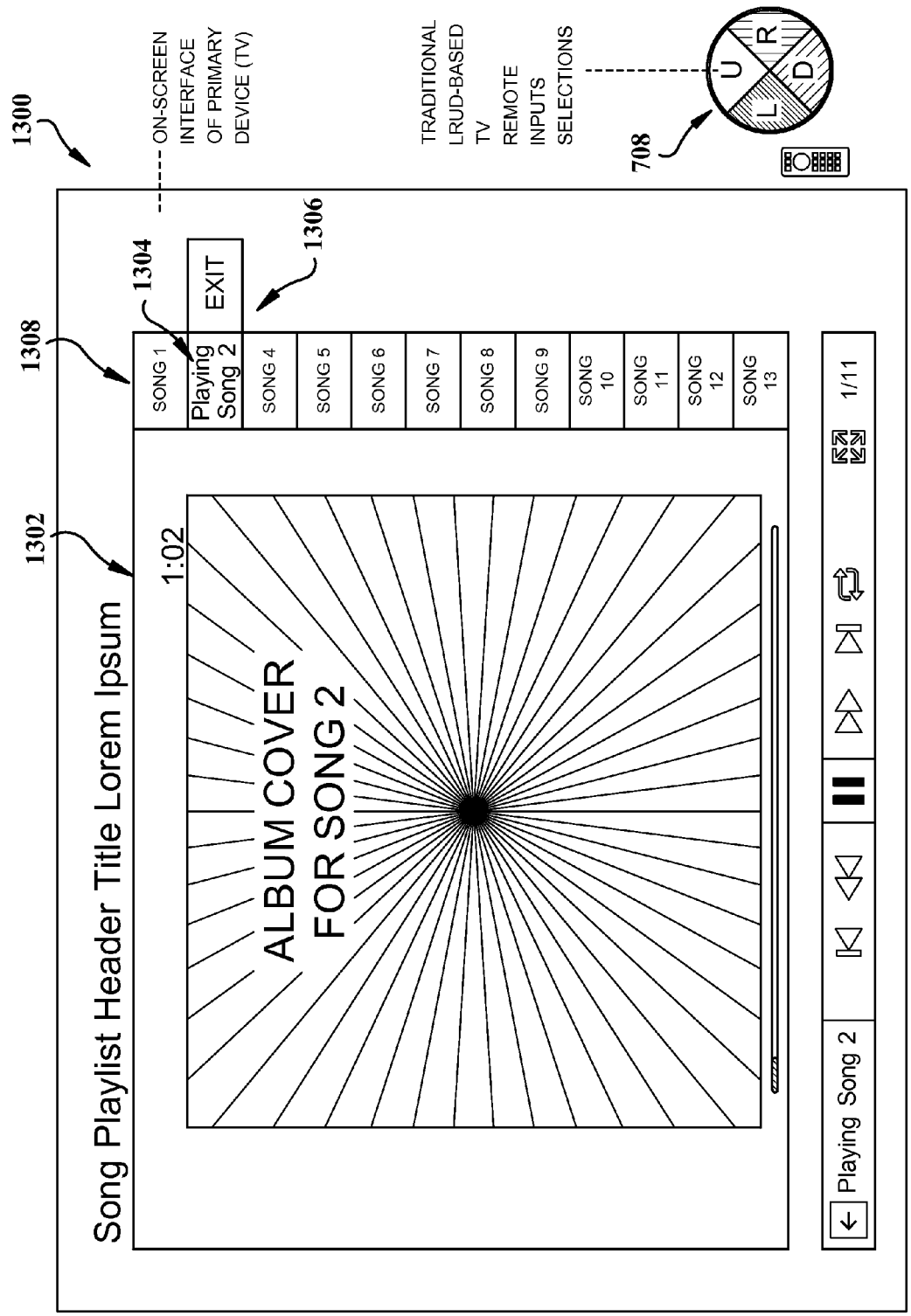
FIG. 13 illustrates a schematic representation of another example layout of a graphical interface that includes a segmented scrollbar and an escape hatch to facilitate navigating a large body of content, in accordance with various aspects and embodiments described herein.

FIG. 13, presents another example interface 1300 generated by interface component 104 that facilitates presenting and navigating large bodies of content, such as mixed videos and songs, in accordance with a seventh embodiment. Interface 1300 can include same or similar functionality as interface 1200 with the exception that the content organized and presented by interface 1300 includes songs associated with a playlist.

Figure 14:
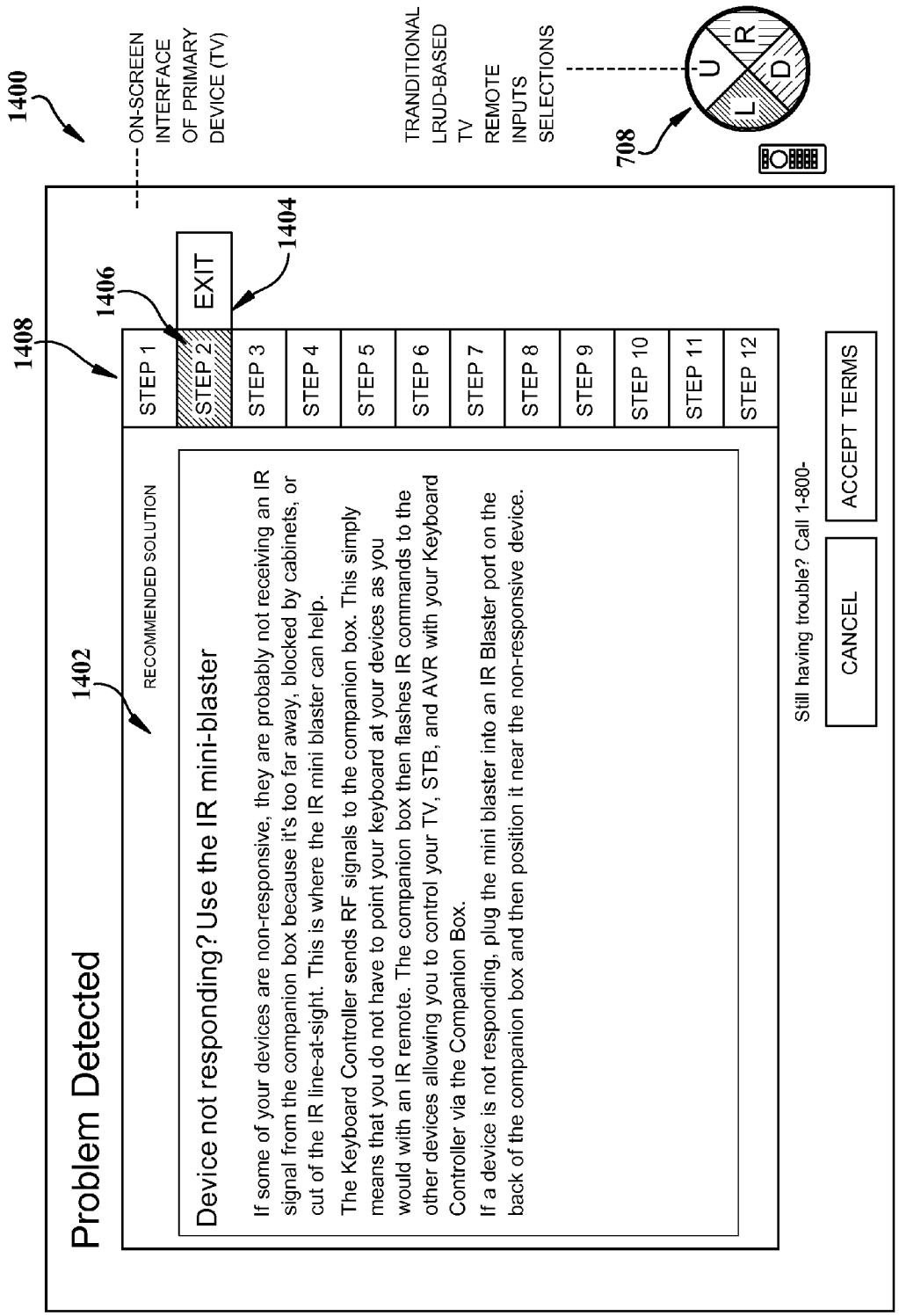
FIG. 14 illustrates a schematic representation of another example layout of a graphical interface that includes a segmented scrollbar and an escape hatch to facilitate navigating a large body of content, in accordance with various aspects and embodiments described herein.

FIG. 14, presents another example interface 1400 generated by interface component 104 that facilitates presenting and navigating large bodies of content, such as text and picture diagnostics manual, in accordance with a eighth embodiment. Interface 1400 can include same or similar functionality as interface 700 with the modification of the type of content being organized and displayed by the interface. For example, rather than displaying a ToS agreement as in interface 700, interface 1400 displays and organizes a diagnostics manual related to solving technical issues/problems associated with the client device at which the interface 1400 is presented and/or associated with an auxiliary device to the client device at which the interface 1400 is presented. The diagnostic manual can include information on several topics related to for example, device hardware, auxiliary device hardware and connectivity, proper operations of device hardware, and device software.

Interface 1400 can include a segmented scrollbar 1408 that includes segments titles with "step 1," "step 2," "step 3," and so on. Each of the segments can correspond to a portion of the diagnostic manual. In an aspect, each of the segments corresponds to a sequential step defined in the diagnostic manual. By moving the scroll box 1406 over each segment step by step, the sequential diagnostic steps of the diagnostic manual are displayed in the display area 1402. The scroll box 1406 can further include an exit widget having the common functionality and features discussed herein (e.g., selection of the exit widget results in dismissal of displayed content or activation of another icon on the interface 1400 and etc.)

In an aspect, rather than placing the scroll box 1402 initially at the first/top segment of the scroll bar 1408, the interface component 104 can employ inference component 106 to infer/determine the portion of the diagnostics manual that is relevant to the user/user device based on a context of the user device. The interface component 104 can then locate the scroll box at the segment corresponding to the relevant portion of the diagnostics manual. For example, with reference to FIG. 1400, the inference component 106 can infer or determine that the client device at which the interface 1400 is displayed, or an auxiliary device to the client device, is non-response based on an infrared (IR) receiving problem. The inference component 106 can further determine that the portion of the diagnostics manual titled "Device not responding? Use the IR mini-blaster," is the most relevant material to the inferred problem. In turn the inference component 106 can inform the interface component 104 of the determined/inferred relevant portion of the diagnostics manual so that the interface component 104 can locate the scroll box over the associated segment.

Figure 15:
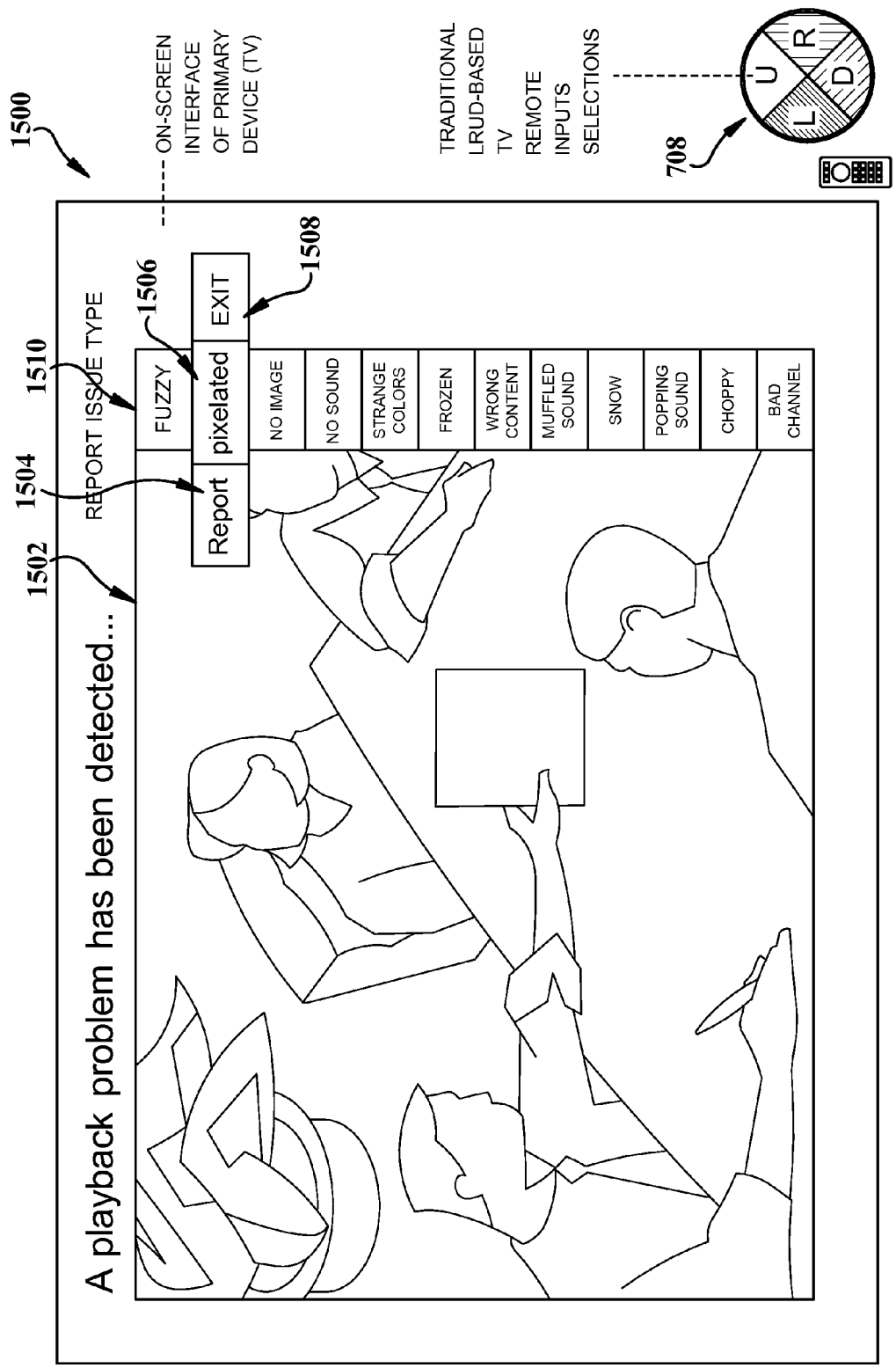
FIG. 15 illustrates a schematic representation of another example layout of a graphical interface that includes a segmented scrollbar and an escape hatch to facilitate navigating a large body of content, in accordance with various aspects and embodiments described herein.

FIG. 15, presents another example interface 1500 generated by interface component 104 that facilitates presenting and navigating large bodies of content, such as various playback issues associated with a detected playback problem of a video presented in a display area of the interface 1500, in accordance with a ninth embodiment. Interface 1500 can include same or similar functionality as interface 1100. With reference back to interface 1100, as a video is being played at a client device in display area 1102 (e.g., where video 2 is being played in interface 1100), software of the client device may detect an issue with playback and provide the user with various editing options to fix the problem. Interface 1500 provides an example interface that facilitates organizing and presenting the various playback issue options using a segmented scrollbar 1510 having a scroll box 1506 and an exit widget with the functionalities discussed herein. Each of the segments of the segmented scrollbar 1510 can correspond to a different playback problem option. In an aspect, selection of a problem option from the segmented scrollbar 1510 can result in an automatic correction of the selected problem.

In interface 1500, the video that was being played with the detected playback problem is presented in display area 1502. A user can employ various input options such as an LRUD television remote 708 to move the scroll box 1506 up and down the segmented scrollbar 1510. The interface component 104 can also generate additional control widgets to attach to the scrollbar based on the playback problem option associated with a segment over which the scroll box 1506 is positions. For example, in FIG. 15, the interface component generates a control widget 1504 that allows a user to report the pixelated problem.

In an aspect, the interface component 104 can employ inference component 106 to determine or infer a particular playback problem associated with playback of the video. For example, in FIG. 15, the inference component 106 could have determined that the problem with video playback is a pixelated problem. The interface component 104 can then locate the scroll box 1506 over the segment corresponding to a pixelated problem.

Figure 16:
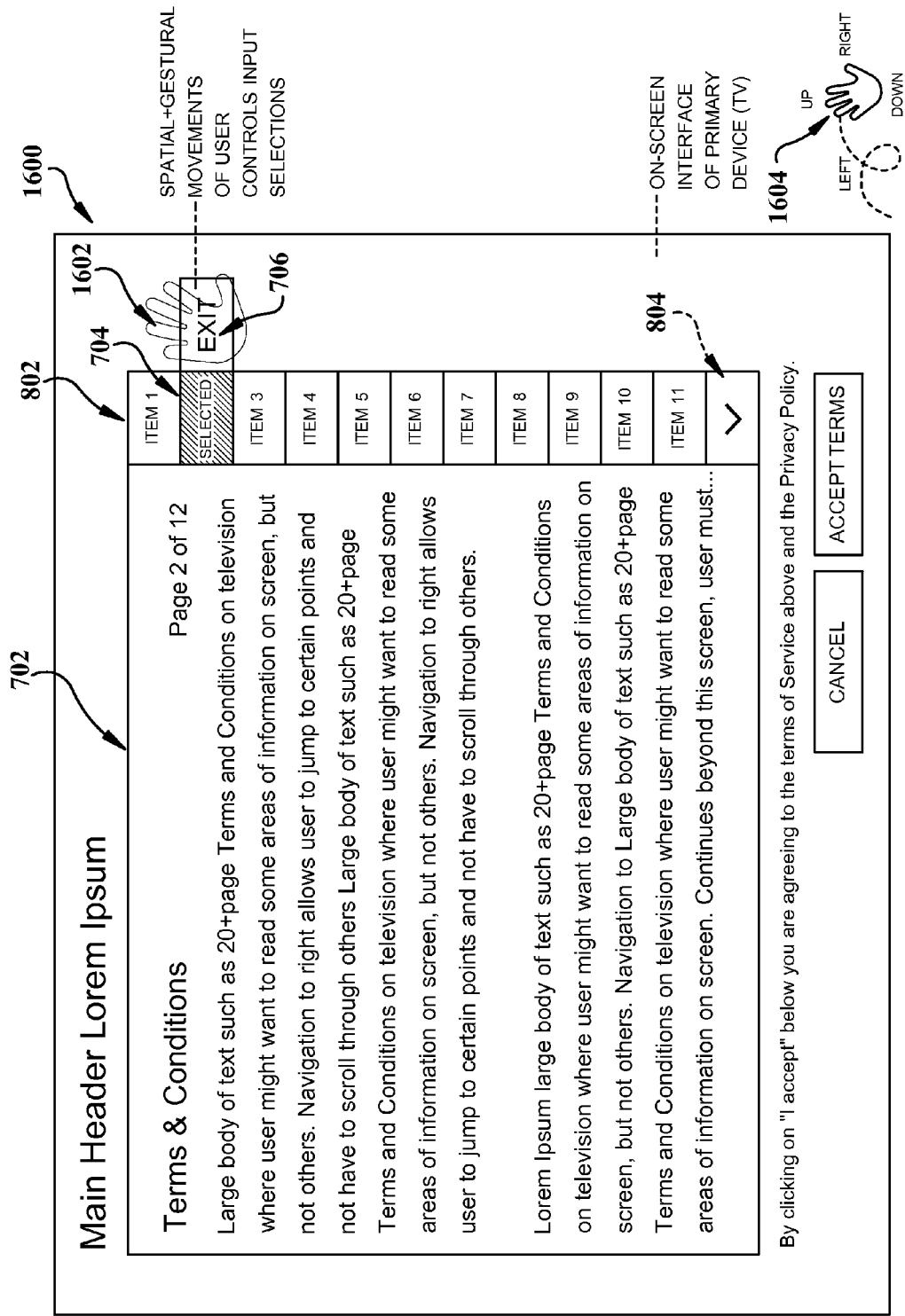
FIG. 16 illustrates a schematic representation of another example layout of a graphical interface that includes a segmented scrollbar and an escape hatch to facilitate navigating a large body of content, in accordance with various aspects and embodiments described herein.

FIG. 16 presents an example interface 1600 generated by interface component 104 that facilitates presenting and navigating large bodies of text content, such as a ToS agreement, in accordance with a tenth embodiment. Interface 1600 is identical to interface 800 with the addition of a ghost hand 1602 to reflect a gesture based input mechanism. In particular, the scroll box 704 is located over item 2 in FIG. 1600. In order to move the scroll box 704 to the exit command widget 706, the user can make a right direction motion with his or hand. A ghost hand 1602 can further be depicted on the screen to reflect the gesture command. For example, rather than employing an LRUD controller to move a scroll box about interface 1600, a user can employ gesture movements as exemplified by the hand motions 1604 of up, down, left and right. It should be appreciated that this type of gesture based input can be employed with any of the interfaces discussed herein.

Figure 17:
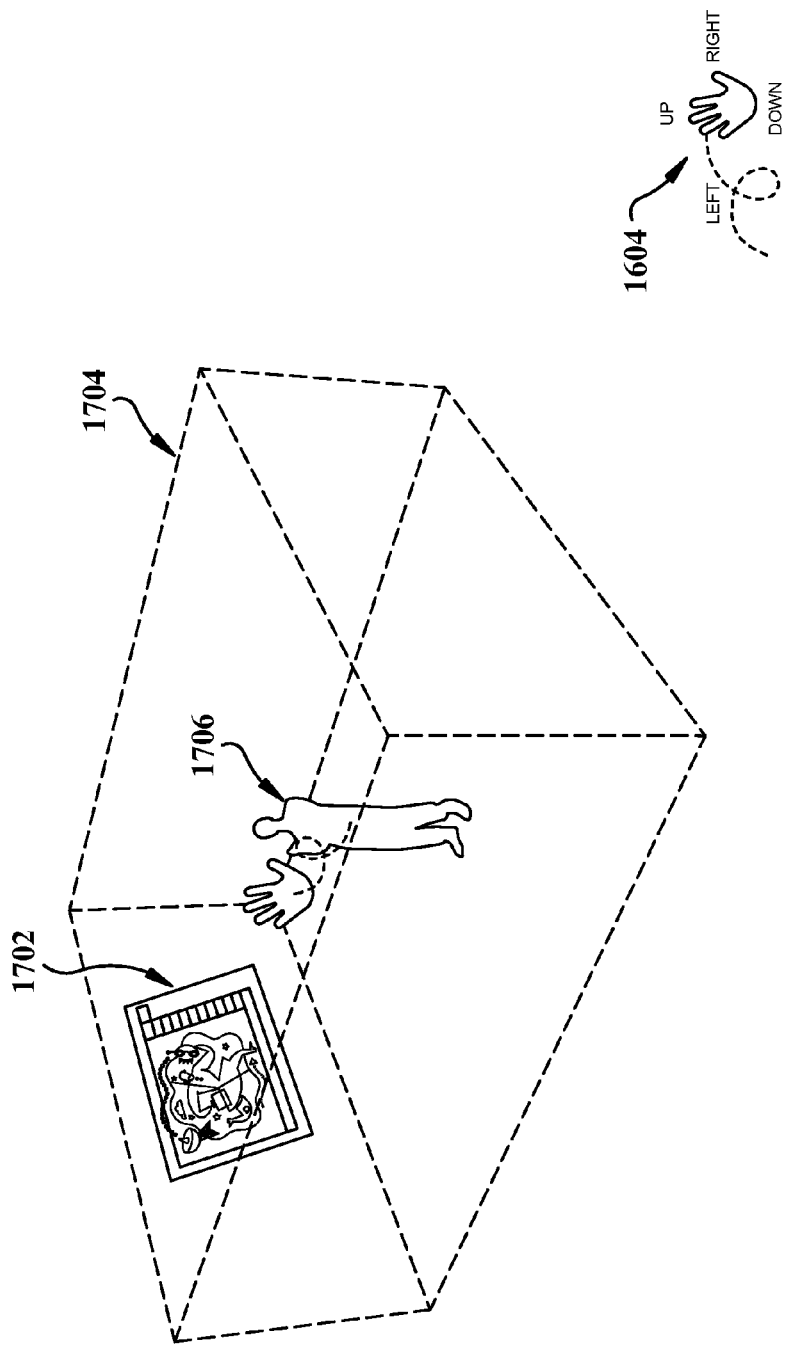
FIG. 17 presents an example embodiment in which an interface generated by the disclosed interfacing platform is projected by a client device as a three dimensional (3D) virtual hologram, in accordance with various aspects and embodiments described herein.

FIG. 17 presents an example embodiment in which an interface 1702 generated by interfacing platform 102 is projected by a client device (not show) as a three dimensional (3D) virtual hologram. Interface 1702 can include the various features and functionalities of any of the interfaces discussed herein. In an aspect, in order to interact with interface 1702, a user 1706 can employ gesture commands 1604. For example, the gesture commands can be interpreted by sensing (e.g., by the client device or an auxiliary device in communication with the client device and/or interfacing platform 102) movement of the users hand within a predetermined 3D grid space 1704 such as a holodeck.

Figure 18:
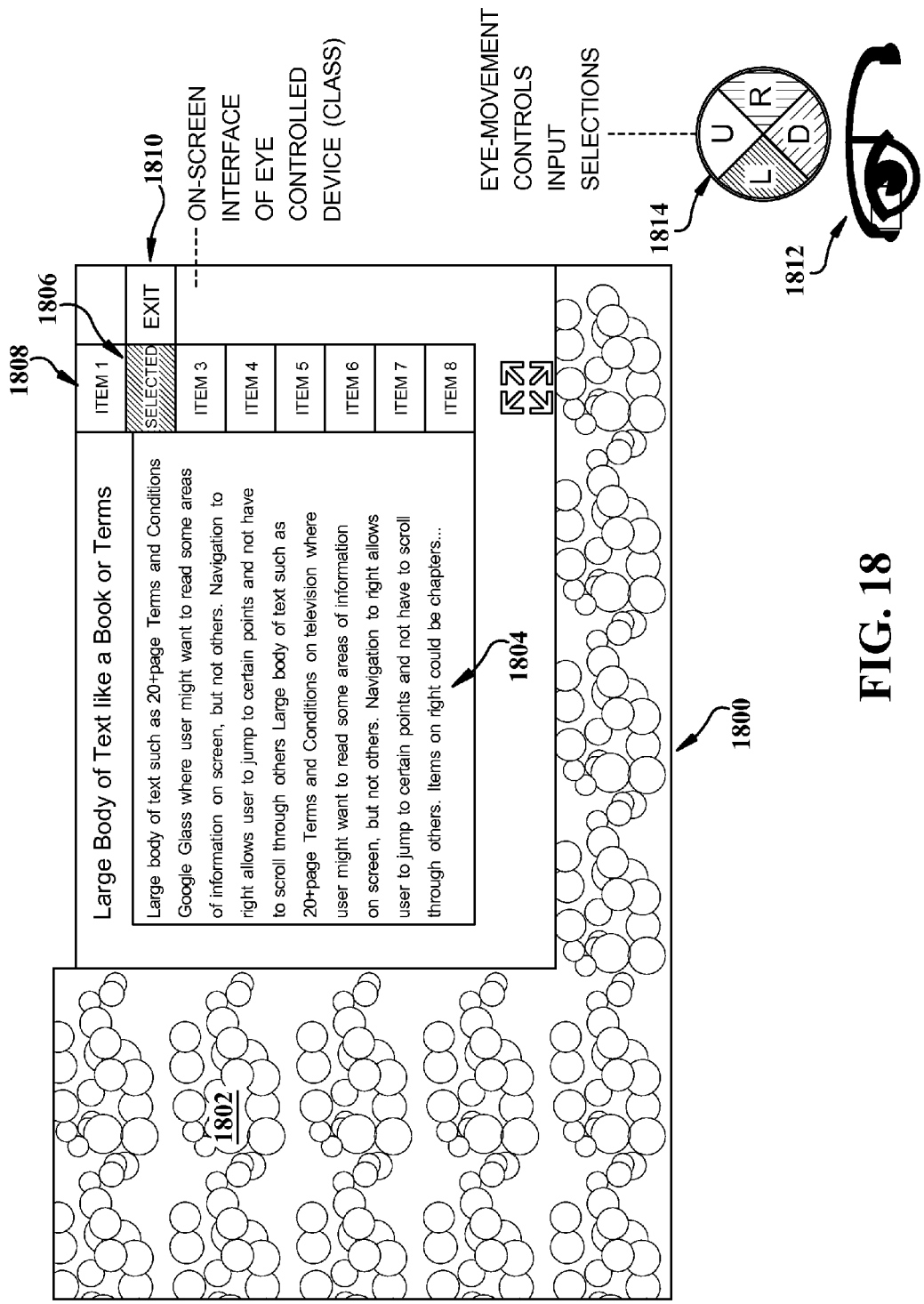
FIG. 18 illustrates a schematic representation of another example layout of a graphical interface that includes a segmented scrollbar and an escape hatch to facilitate navigating a large body of content, in accordance with various aspects and embodiments described herein.

FIG. 18 presents an example embodiment in which an interface 1800 generated by interfacing platform 102 is projected onto a screen or glass piece of a client device 1812 worn over an eye according to an eleventh embodiment. Interface 1800 can include the various features and functionalities of any of the interfaces discussed herein. For example, interface 1800 can include a primary display area 1802, a secondary display area 1804 in which a body of text is displayed, a segmented scrollbar 1808 having a plurality of segments that are associated with respective portions of a the body of text (e.g., Item 1 can correspond to chapter 1 of the text, Item 2 can correspond to chapter 2 of the text, and etc.), a scroll box 1806 configured to move about the scroll bar 1808 and an exit widget 1806 attached to the scroll box 1806. In an aspect, as shown in FIG. 18, the interface 1800 can include various layers or overlays of images, text, objects and etc. For example, the interface component 104 can generate the body of text in the secondary display area and associated scrollbar, scroll box and exit widget, as an overlay over another object or screen consuming an area of the display primary display area 1802.

In an aspect, in order to interact with interface 1800, a user can employ gesture commands in the form of eye movements. For example, the client device 1812 can be configured to interpret eye movements of up/down/left/right 1814 as input commands to move the text box 1806 (or cursor) up/down/left/right respectively. In another example, the client device 1812 can be configured to interpret opening and closing of eyes or blinking as input commands (e.g., one blink means enter, two blinks means back, and etc.).

Figure 19:
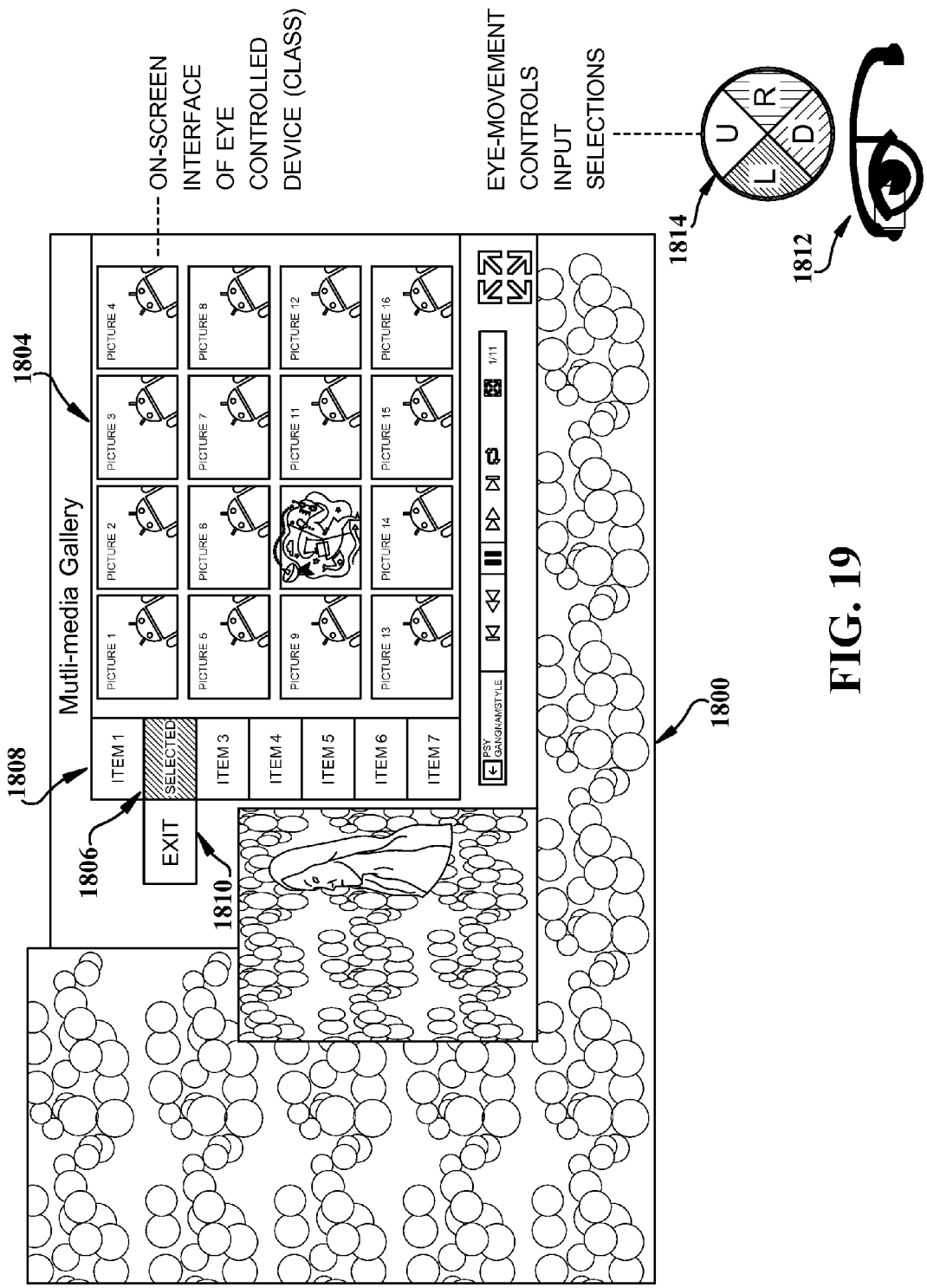
FIG. 19 illustrates a schematic representation of another example layout of a graphical interface that includes a segmented scrollbar and an escape hatch to facilitate navigating a large body of content, in accordance with various aspects and embodiments described herein.

FIG. 19 presents another example embodiment in which an interface 1900 generated by interfacing platform 102 is projected onto a screen or glass piece of a client device 1812 worn over an eye according to a twelfth embodiment. Interface 1900 can include the various features and functionalities of any of the interfaces discussed herein. Interface 1900 is substantially similar to interface 1800 with the modification of the type of overlay generated by the interface component 104. For example, interface 1900 can include a primary display area 1802, a secondary display area 1804 in which content is displayed, a segmented scrollbar 1908 having a plurality of segments corresponding to portions of the content, a scroll box 1806 configured to move about the scroll bar 1808 and an exit widget 1810 attached to the scroll box 1806.

However, rather than the content of the overlay in the second display area 1804 consisting of a body of text, the content includes a multi-media gallery consisting of a plurality of pictures. Further, each of the segments of the segmented scrollbar 1808 are associated with one of the pictures of the plurality of pictures presented in the secondary display area 1804. Also, the layout of the overlay of interface 1900 provides the segmented scrollbar on the left side of the secondary display area 1804 as opposed to the right side of the secondary display area 1804.

Figure 20:
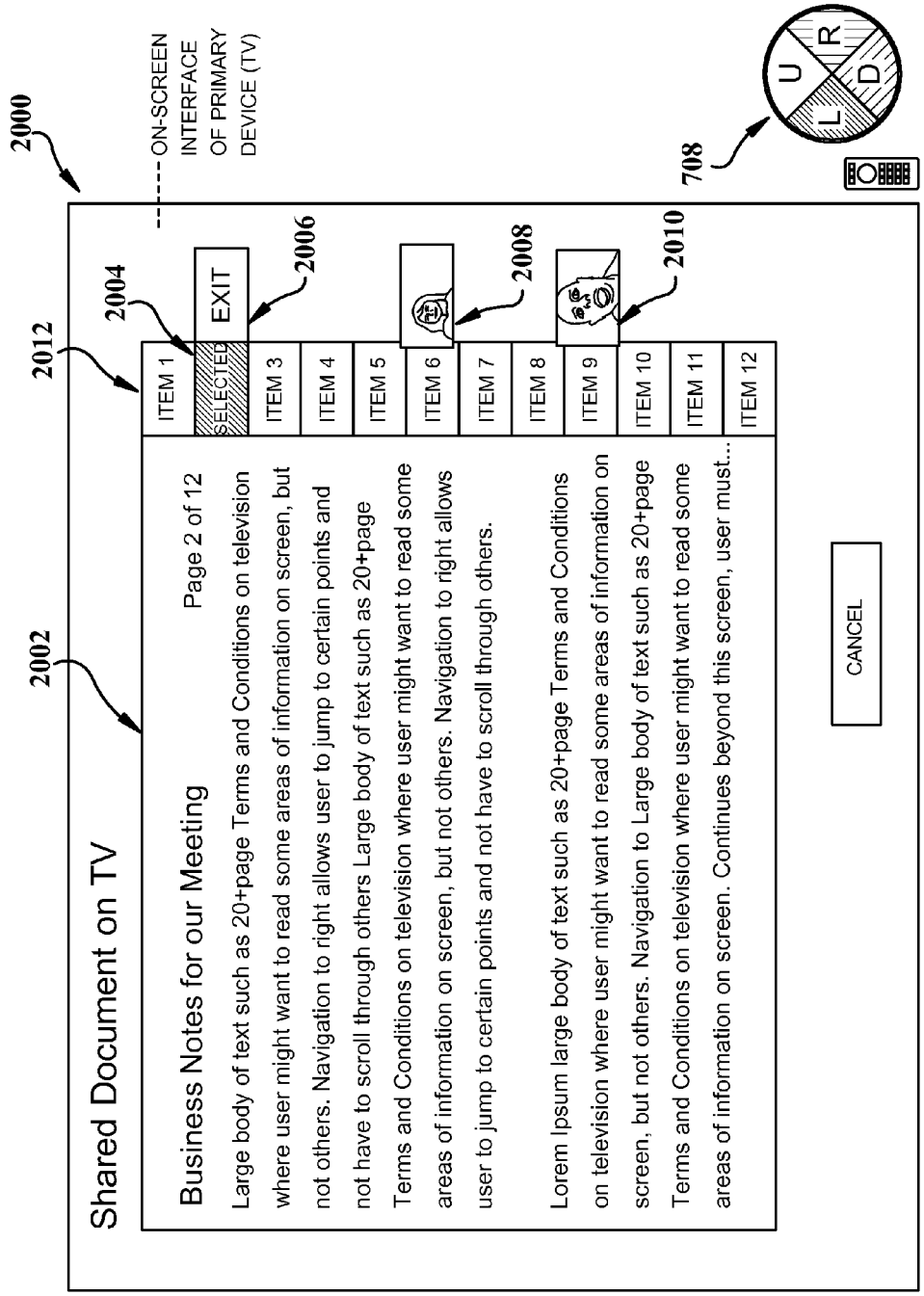
FIG. 20 illustrates a schematic representation of another example layout of a graphical interface that includes a segmented scrollbar and an escape hatch to facilitate navigating a large body of content, in accordance with various aspects and embodiments described herein.

FIG. 20 presents another example interface 2000 generated by interface component 104 that facilitates presenting and navigating large bodies of content, such as business notes for a meeting, in accordance with a thirteenth embodiment. Interface 2000 can include the various features and functionalities of other interfaces discussed herein. Interface 2000 is similar to interface 700. For example, interface 2000 includes a display area 2002 having a body of text. In interface 700 the body of text was a ToS agreement while in interface 2000 the body of text is business notes for a meeting. Interface 2000 also includes a fixed segmented scrollbar 2012 wherein respective segments of the segmented scrollbar correspond to respective portions of the body of text in the display area 2002. The scrollbar 2012 further includes a scroll box 2004 and an exit widget.

Interface 2000 provides an additional social feature associated with a shared document that can be viewed/consumed by two or more users. For example, the content in the display area 2002 can be a document that is shared with multiple client devices for viewing. In an aspect, the document can be shared at the same time or substantially same time such that each of the respective users are consuming the document in real-time. In one aspect, interface component 104 can attach icons representative of a user, such as images or other picture representative of a user, to respective segments of the segmented scrollbar indicating the portion of the document in display area 2002 that the user has viewed and/or is currently viewing. A social component 206 can facilitate identifying what users have view respective portions of the content and any additional information about interaction between the users and the content. The social component 206 can provide such information to the interface component 104 to facilitate generating the social features of the interface 2000 (e.g., icons and associated information).

For example, the segmented toolbar of interface 2000 includes an icon of a first user 2008 attached to the segment titled "Item 6," and an icon of a second user 2010 attached to the segment titled "Item 9." In additional aspects, the icon attached to the segmented scrollbar 2012 can include a variety of information (aside from a mere picture) describing interaction between the user represented by the icon and the portion of the document he or she is associated with. For example, the icon can include comments about the portion of the document, an indication of whether the user likes or dislikes the portion of the document, a timestamp of when the user viewed the portion of the document, edits to the portion of the document, and etc. In an aspect, such additional information can be included with the icon as displayed on the interface 2000, In another aspect, such additional information can be retrieved by selecting the icon representative of the user who associated with the segment.

Figure 21:
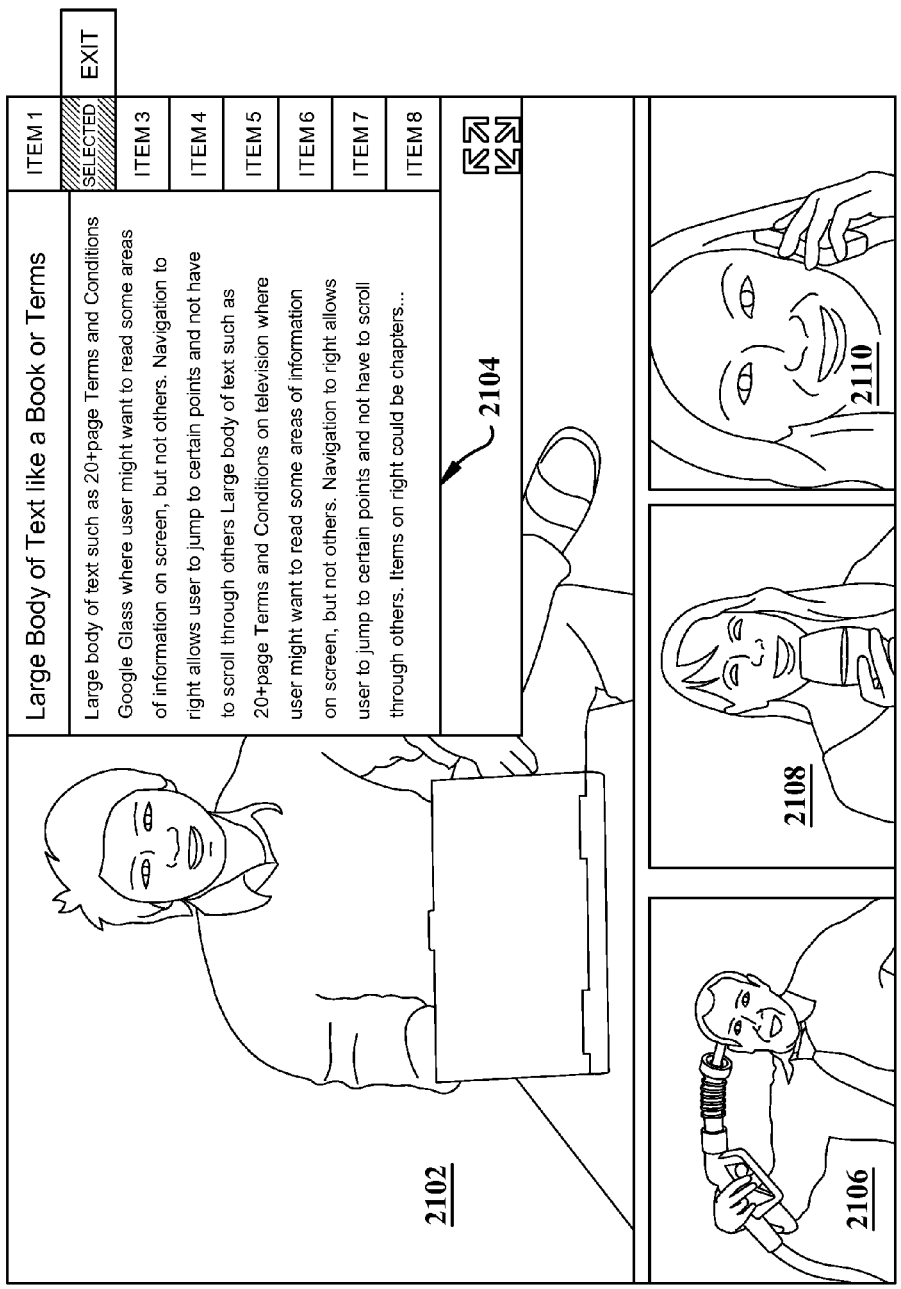
FIG. 21 illustrates a schematic representation of another example layout of a graphical interface that includes a segmented scrollbar and an escape hatch to facilitate navigating a large body of content, in accordance with various aspects and embodiments described herein.

FIG. 21 presents another example interface 2100 generated by interface component 104 that facilitates presenting and navigating large bodies of shared textual content, in accordance with a fourteenth embodiment. In particular, interface 2100 facilitates viewing/consuming content (e.g., a large body of text in FIG. 20) by multiple users at a same or substantially same time. For example, in interface 2100, the various users viewing the document can be provided in different windows 2102, 2106, 2108, and 2110. The document itself and associated scrollbar including the functionalities described herein, can be provided as an overlay over one or more of the windows.

Interface 2100 can include the various features and functionalities of other interfaces discussed herein. For example, interface 2100 includes a primary display area 2102 and multiple secondary display areas or windows 2104, 2106, 2108, and 2110. In secondary display area 2104, interface component 104 generates a graphical user interface as an overlay substantially similar to the interface provided as an overlay in interface 1800 (e.g., comprising of the secondary display area 1804, the segmented scrollbar 1808, the scroll box 1806 and the exit widget).

In an aspect, each of the users viewing/consuming the document in secondary display area 2104 can control the scroll box and thus control the portion of the document that is viewed by each of the users at the same time. Thus each of the users can share control over the movement of the scroll box. In another embodiment, only a single user of the plurality of users can control the movement of the scroll box and thus control the portion of the content that is displayed.

Figure 22:
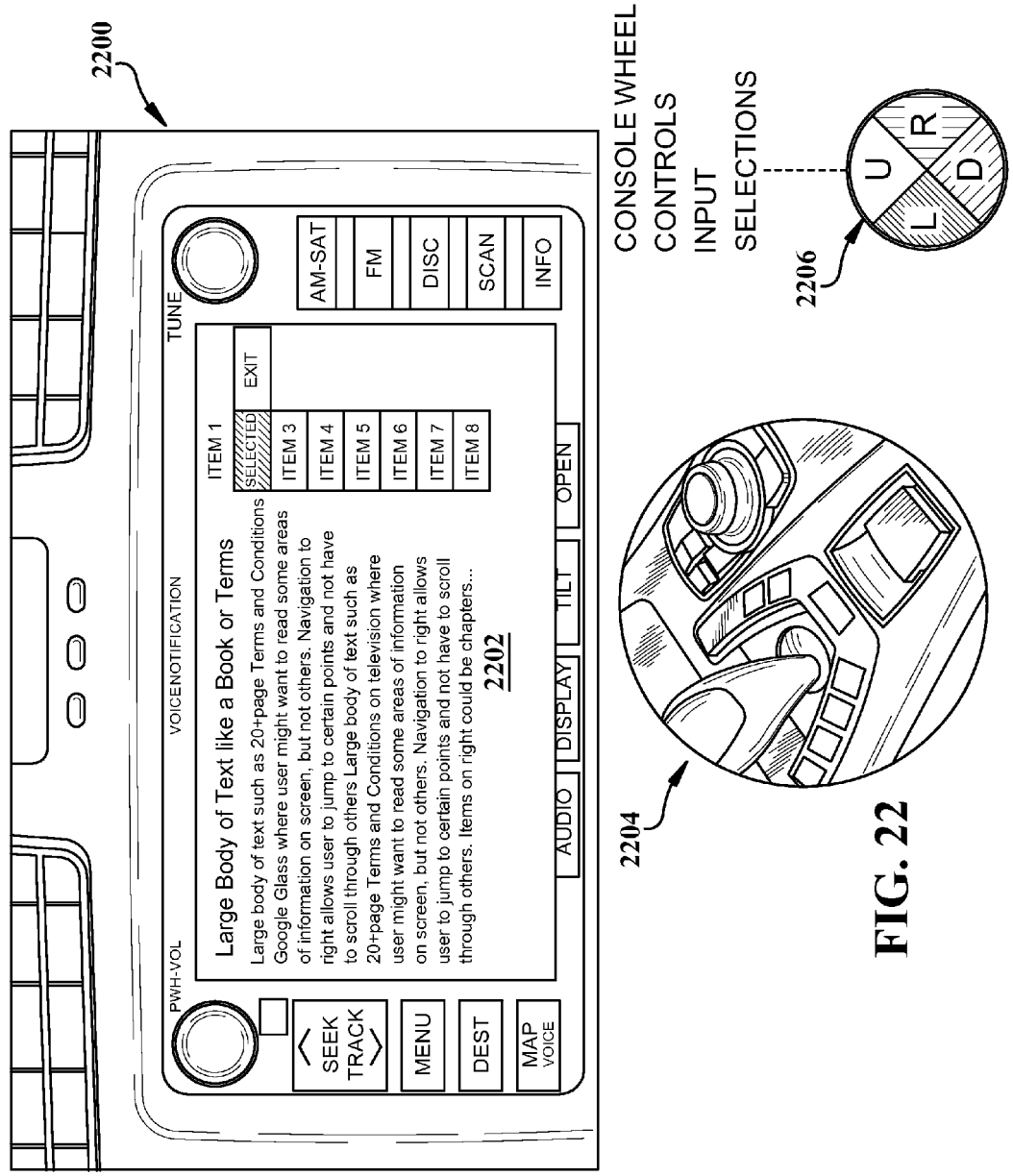
FIG. 22 illustrates a schematic representation of an example graphical interface that provided on a display device in a car that includes a segmented scrollbar and an escape hatch to facilitate navigating a large body of content, in accordance with various aspects and embodiments described herein.

FIG. 22 presents an example embodiment in which an interface 2202 generated by interfacing platform 102 is provided on a display screen located within a vehicle 2200 (or other type of transportation machine). Interface 2200 can include the various features and functionalities of any of the interfaces discussed herein. In an aspect, in order to interact with interface 2204, a user can employ a controller provided within the vehicle 2204 or 2206 that provides for basic input commands (e.g., up/down/left/right, enter, back, and etc.). However, it should be appreciated that the various types of input mechanisms described herein (e.g., voice commands) can be employed by a user to interact with interface 2202.

Figure 23:
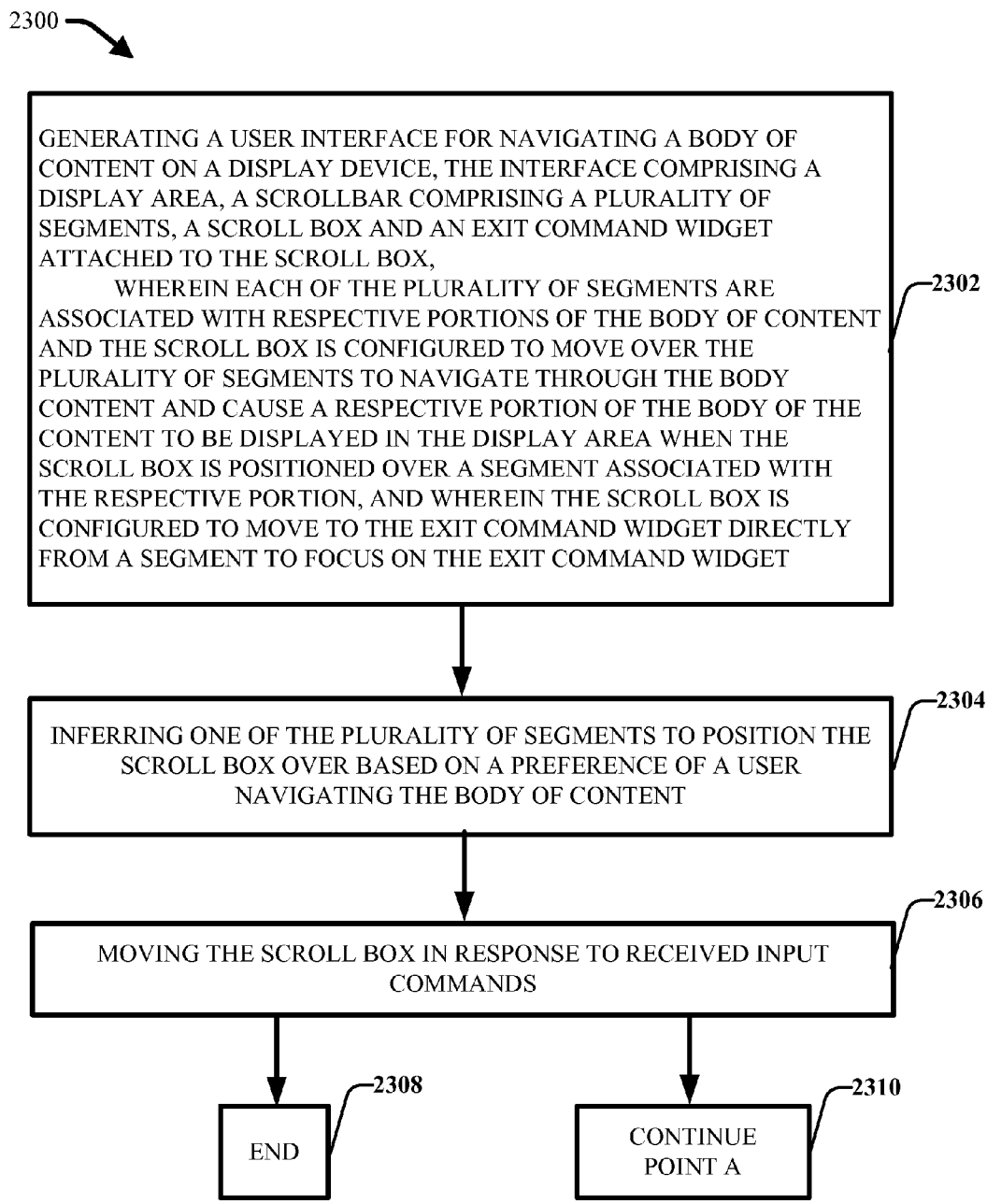
FIG. 23 is a flow diagram of an example method that facilitates navigating large bodies of content using a graphical interface having a segmented scrollbar and an escape hatch in accordance with various aspects and embodiments described herein.
Figure 24:
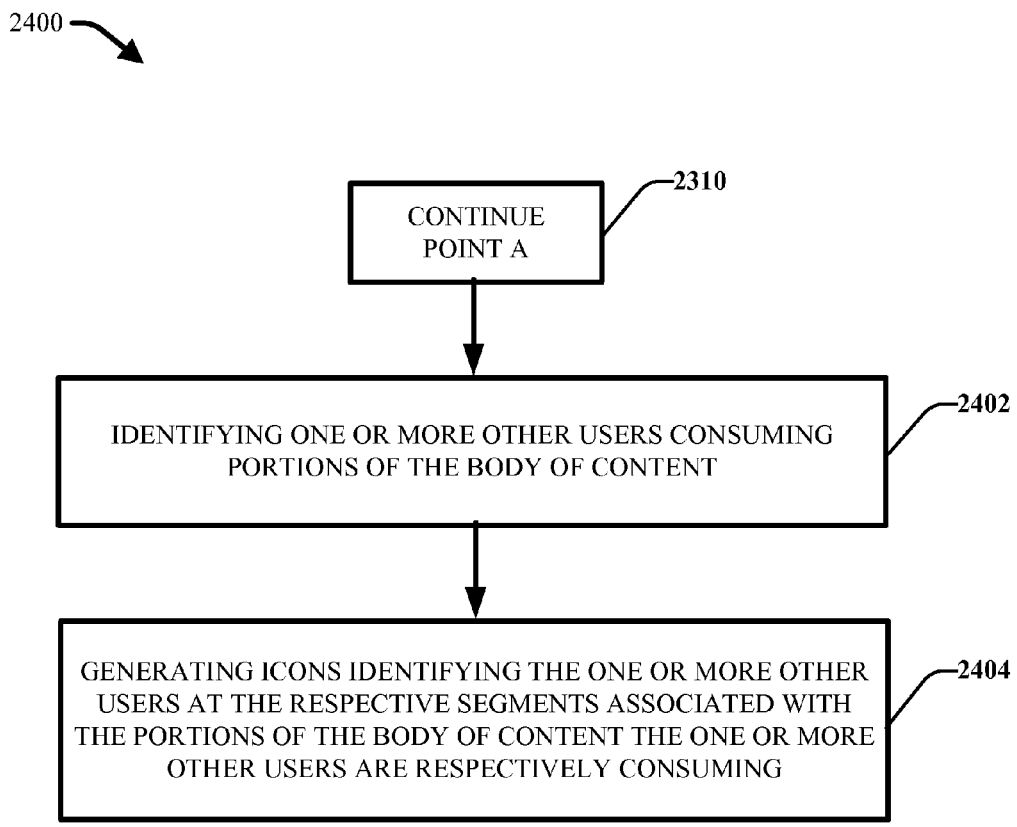
FIG. 24 is a flow diagram of another example method that facilitates navigating large bodies of content using a graphical interface having a segmented scrollbar and an escape hatch in accordance with various aspects and embodiments described herein.

In view of the example systems/interface described herein, example methods that can be implemented in accordance with the disclosed subject matter can be further appreciated with reference to flowcharts in FIGS. 23-24. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 23 illustrates a flow chart of an example method 1300 for facilitating navigation of large bodies of content on a graphical user interface of a device using a basic input controller. At 2302, a user interface for navigating a body of content on a display device is generated (e.g., using interface component 104). The interface includes a display area, a scrollbar comprising a plurality of segments, a scroll box and an exit command widget attached to the scroll box. Each of the plurality of segments are associated with respective portions of the body of content and the scroll box is configured to move over the plurality of segments to navigate through the body content and cause a respective portion of the body of the content to be displayed in the display area when the scroll box is positioned over a segment associated with the respective portion, and wherein the scroll box is configured to move to the exit command widget directly from a segment to focus on the exit command widget.

At 2304, one of the plurality of segments to position the scroll box over is inferred based on a preference of a user navigating the body of content (e.g., using inference component 106). The interface component 104 can then position the scroll box over the one of the plurality of segments. At 2306, the scroll box is moved in response to received input commands (e.g., using the input component 108). For example, the input component 108 can receive a command to move the scroll box to the attached exit command widget, or a command to move the scroll box to another segment of the segmented scrollbar. The input component can further receive commands to select a segment or the exit widget. The input component 108 and/or interface component 104 can further effectuate received commands by causing the scroll box to move appropriately. At point 2308 method 2300 can end and at point 2310 method 2300 can continue with method 2400 discussed next.

FIG. 24 illustrates a flow chart of another example method 2400 for facilitating navigation of large bodies of content on a graphical user interface of a device using a basic input controller. Method 2400 is a continuation of method 2300 at continue point A, 2310. At 2402, one or more other users consuming portions of the body of content are identified (e.g., using social component 206). At 2404, icons identifying the one or more other users at the respective segments associated with the portions of the body of content the one or more other users are respectively consuming are generated (e.g., using social component 206 and/or interface component 104).

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 25:
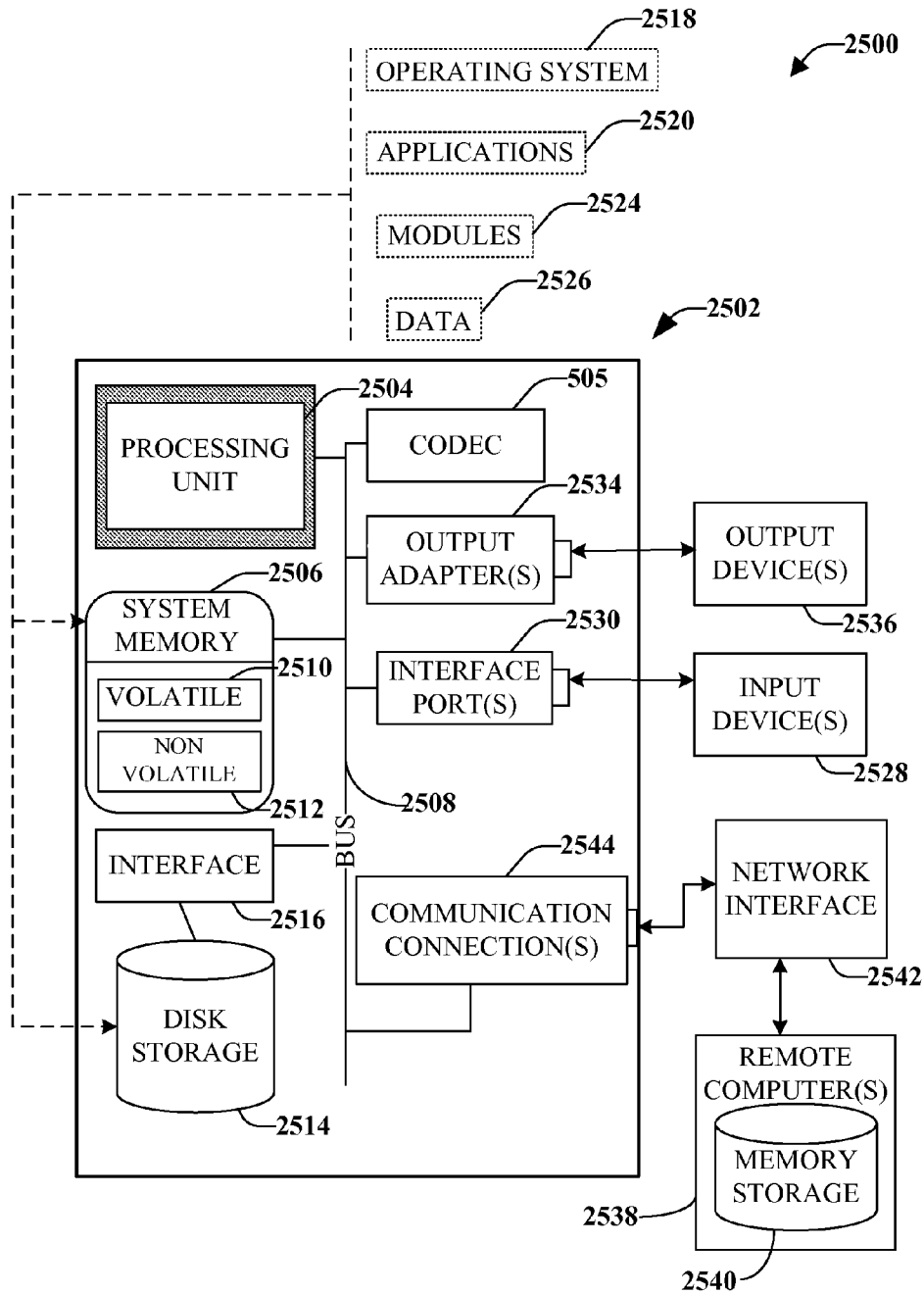
FIG. 25 is a schematic block diagram illustrating a suitable operating environment in accordance with various aspects and embodiments.

With reference to FIG. 25, a suitable environment 2500 for implementing various aspects of the claimed subject matter includes a computer 2502. The computer 2502 includes a processing unit 2504, a system memory 2506, a codec 2505, and a system bus 2508. The system bus 2508 couples system components including, but not limited to, the system memory 2506 to the processing unit 2504. The processing unit 2504 can be any of various available processors. Dual microprocessors and other multiprocessor architectures also can be employed as the processing unit 2504.

The system bus 2508 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 2506 includes volatile memory 2510 and non-volatile memory 2512. The basic input/output system (BIOS), containing the basic routines to transfer information between elements within the computer 2502, such as during start-up, is stored in non-volatile memory 2512. In addition, according to present innovations, codec 2505 may include at least one of an encoder or decoder, wherein the at least one of an encoder or decoder may consist of hardware, a combination of hardware and software, or software. Although, codec 2505 is depicted as a separate component, codec 2505 may be contained within non-volatile memory 2512. By way of illustration, and not limitation, non-volatile memory 2512 can include read only memory (ROM), programmable ROM (PROM), electrically programmable ROM (EPROM), electrically erasable programmable ROM (EEPROM), or flash memory. Volatile memory 2510 includes random access memory (RAM), which acts as external cache memory. According to present aspects, the volatile memory may store the write operation retry logic (not shown in FIG. 25) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 2502 may also include removable/non-removable, volatile/non-volatile computer storage medium. FIG. 25 illustrates, for example, disk storage 2514. Disk storage 2514 includes, but is not limited to, devices like a magnetic disk drive, solid state disk (SSD) floppy disk drive, tape drive, Jaz drive, Zip drive, LS-70 drive, flash memory card, or memory stick. In addition, disk storage 2514 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2514 to the system bus 2508, a removable or non-removable interface is typically used, such as interface 2516.

It is to be appreciated that FIG. 25 describes software that acts as an intermediary between users and the basic computer resources described in the suitable operating environment 2500. Such software includes an operating system 2518. Operating system 2518, which can be stored on disk storage 2514, acts to control and allocate resources of the computer system 2502. Applications 2520 take advantage of the management of resources by operating system 2518 through program modules 2524, and program data 2526, such as the boot/shutdown transaction table and the like, stored either in system memory 2506 or on disk storage 2514. It is to be appreciated that the claimed subject matter can be implemented with various operating systems or combinations of operating systems.

A user enters commands or information into the computer 2502 through input device(s) 2528. Input devices 2528 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2504 through the system bus 2508 via interface port(s) 2530. Interface port(s) 2530 include, for example, a serial port, a parallel port, a game port, and a universal serial bus (USB). Output device(s) 2536 use some of the same type of ports as input device(s). Thus, for example, a USB port may be used to provide input to computer 2502, and to output information from computer 2502 to an output device 2536. Output adapter 2534 is provided to illustrate that there are some output devices 2536 like monitors, speakers, and printers, among other output devices 2536, which require special adapters. The output adapters 2534 include, by way of illustration and not limitation, video and sound cards that provide a means of connection between the output device 2536 and the system bus 2508. It should be noted that other devices and/or systems of devices provide both input and output capabilities such as remote computer(s) 2538.

Computer 2502 can operate in a networked environment using logical connections to one or more remote computers, such as remote computer(s) 2538. The remote computer(s) 2538 can be a personal computer, a server, a router, a network PC, a workstation, a microprocessor based appliance, a peer device, a smart phone, a tablet, or other network node, and typically includes many of the elements described relative to computer 2502. For purposes of brevity, only a memory storage device 2540 is illustrated with remote computer(s) 2538. Remote computer(s) 2538 is logically connected to computer 2502 through a network interface 2542 and then connected via communication connection(s) 2544. Network interface 2542 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2544 refers to the hardware/software employed to connect the network interface 2542 to the bus 2508. While communication connection 2544 is shown for illustrative clarity inside computer 2502, it can also be external to computer 2502. The hardware/software necessary for connection to the network interface 2542 includes, for exemplary purposes only, internal and external technologies such as, modems including regular telephone grade modems, cable modems and DSL modems, ISDN adapters, and wired and wireless Ethernet cards, hubs, and routers.

Figure 26:
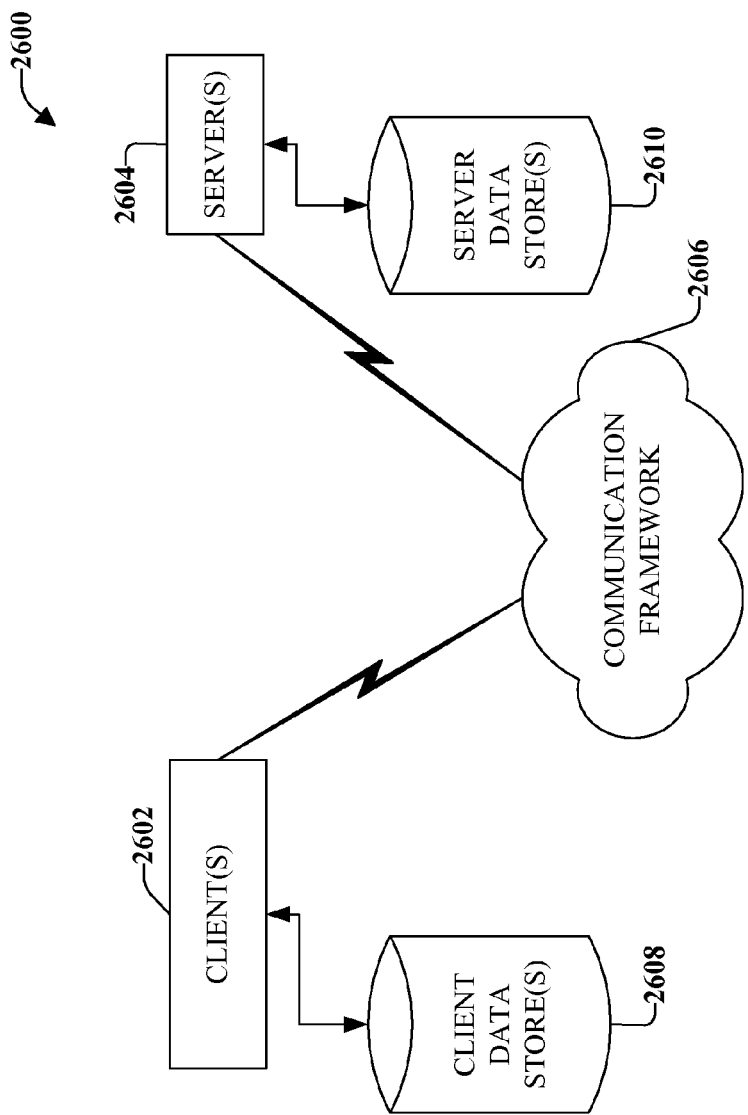
FIG. 26 is a schematic block diagram of a sample-computing environment in accordance with various aspects and embodiments.

Referring now to FIG. 26, there is illustrated a schematic block diagram of a computing environment 2600 in accordance with this disclosure. The system 2600 includes one or more client(s) 2602 (e.g., laptops, smart phones, PDAs, media players, computers, portable electronic devices, tablets, and the like). The client(s) 2602 can be hardware and/or software (e.g., threads, processes, computing devices). The system 2600 also includes one or more server(s) 2604. The server(s) 2604 can also be hardware or hardware in combination with software (e.g., threads, processes, computing devices). The servers 2604 can house threads to perform transformations by employing aspects of this disclosure, for example. One possible communication between a client 2602 and a server 2604 can be in the form of a data packet transmitted between two or more computer processes wherein the data packet may include video data. The data packet can include a metadata, e.g., associated contextual information, for example. The system 2600 includes a communication framework 2606 (e.g., a global communication network such as the Internet, or mobile network(s)) that can be employed to facilitate communications between the client(s) 2602 and the server(s) 2604.

Communications can be facilitated via a wired (including optical fiber) and/or wireless technology. The client(s) 2602 include or are operatively connected to one or more client data store(s) 2608 that can be employed to store information local to the client(s) 2602 (e.g., associated contextual information). Similarly, the server(s) 2604 are operatively include or are operatively connected to one or more server data store (s) 2610 that can be employed to store information local to the servers 2604.

In one embodiment, a client 2602 can transfer an encoded file, in accordance with the disclosed subject matter, to server 2604. Server 2604 can store the file, decode the file, or transmit the file to another client 2602. It is to be appreciated, that a client 2602 can also transfer uncompressed file to a server 2604 and server 2604 can compress the file in accordance with the disclosed subject matter. Likewise, server 2604 can encode video information and transmit the information via communication framework 2606 to one or more clients 2602.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory having stored thereon computer executable components; and
    a processor configured to execute the following computer executable components stored in the memory:
        an interface component configured to generate a user interface for navigating a body of content on a display device, the user interface displaying a display area, a scrollbar comprising a plurality of segments, a scroll box and an exit command widget attached to the scroll box, wherein one or more of the plurality of segments are associated with respective portions of the body of content and the scroll box is configured to move over the plurality of segments to navigate through the body content and cause a respective portion of the body of the content to be displayed in the display area when the scroll box is positioned over a segment of the plurality of segments, wherein the segment is associated with the respective portion, and wherein the scroll box is configured to move to the exit command widget directly from the segment to focus on the exit command widget;
        an inference component configured to infer one of the plurality of segments to position the scroll box over based on a preference of a user navigating the body of content;
        an input component configured to move the scroll box in response to received input commands; and
        a social component configured to identify a first set of one or more users consuming portions of the body of content, wherein the interface component is further configured to generate icons identifying the first set of one or more other users at the respective segments associated with the portions of the body of content the first set of one or more other users are respectively consuming.

2. The system of claim 1, wherein upon the input command receiving an input corresponding to selection of the exit command widget, the interface component dismisses a portion of the body of content displayed in the display area that is associated with a segment over which the scroll box was positioned prior to moving to the exit command widget.

3. The system of claim 1, wherein upon the input command receiving an input corresponding to selection of the exit command widget, the interface component causes another object of the user interface to become active.

4. The system of claim 1, wherein the input component is configured to move the scroll box about the plurality of segments, select the segment of the plurality of segments, move the scroll box to the exit widget and select the exit command widget in response to received input commands from an input device.

5. The system of claim 4, wherein the input component is configured to receive up, down, left, right and select commands and the scroll box is configured to move from a first one of the plurality of segments to a second one of the plurality segments in response to an up command or a down command and the scroll box is configured to move to an exit command object in response to a right command or a left command.

6. The system of claim 1, wherein one or more of the plurality of segments are arranged based on sequential order of the respective portions of the body of content respectively associated with the one or more of the plurality of segments.

7. The system of claim 1, wherein the body of content includes a body of text and the respective portions of the body of content correspond to different pages of the body of text, wherein the scroll box is configured to move about segments of the plurality of segments to present the different pages of the body of text in the display area.

8. The system of claim 1, wherein the body of content includes multimedia files and the respective portions of the body of content correspond to different multimedia files, wherein the scroll box is configured to move about segments to present the different multimedia files in the display area.

9. The system of claim 1, wherein the body of content includes multimedia files and the respective portions of the body of content correspond to sets of the multimedia files, wherein the scroll box is configured to move about segments to present respective sets of the multimedia files in the display area, and wherein the multimedia files included in the set are displayed as thumbnails in the display area.

10. The system of claim 1, wherein the preference of the user is defined in a user profile accessible to the system.

11. The system of claim 1, further comprising a preference detection component configured to infer the preference of the user based in part on historical navigation patterns.

12. The system of claim 1, wherein the inference component is further configured to infer the one of the plurality of segments to position the scroll box over based on preferences of a second set of one or more other users related to the user navigating the body of content.

13. The system of claim 1, further comprising a context component configured to identify a context of the display device and wherein the inference component is configured to infer one of the plurality of segments to position the scroll box over based on the context.

14. The system of claim 13, wherein the context relates to a specific technical issue associated with hardware or software of the display device and the body of content relates to general technical issues associated with hardware of software of the display device.

15. The system of claim 1, wherein the interface component is further configured to generate one or more additional command widgets attached to the scroll box based on options associated with a portion of the body of content associated with a segment over which the scroll box is positioned, wherein the scroll box is configured to move to the one or more additional command widgets directly from the segment to focus on the one or more additional command widgets.

16. A method comprising:
using a processor to execute the following computer executable instructions stored in a memory to perform acts comprising:
generating a user interface for navigating a body of content on a display device, the interface comprising a display area, a scrollbar comprising a plurality of segments, a scroll box and an exit command widget attached to the scroll box, wherein each of the plurality of segments are associated with respective portions of the body of content and the scroll box is configured to move over the plurality of segments to navigate through the body content and cause a respective portion of the body of the content to be displayed in the display area when the scroll box is positioned over a segment associated with the respective portion, and wherein the scroll box is configured to move to the exit command widget directly from a segment to focus on the exit command widget;
inferring one of the plurality of segments to position the scroll box over based on a preference of a user navigating the body of content;
moving the scroll box in response to received input commands;
identifying one or more other users consuming portions of the body of content; and
displaying icons identifying the one or more other users at the respective segments associated with the portions of the body of content the one or more other users are respectively consuming.

17. A tangible computer-readable storage medium comprising computer-readable instructions that, in response to execution, cause a computing system to perform operations, comprising:
generating a user interface for navigating a body of content on a display device, the interface comprising a display area, a scrollbar comprising a plurality of segments, a scroll box and an exit command widget attached to the scroll box, wherein each of the plurality of segments are associated with respective portions of the body of content and the scroll box is configured to move over the plurality of segments to navigate through the body content and cause a respective portion of the body of the content to be displayed in the display area when the scroll box is positioned over a segment associated with the respective portion, and wherein the scroll box is configured to move to the exit command widget directly from a segment to focus on the exit command widget;
inferring one of the plurality of segments to position the scroll box over based on a preference of a user navigating the body of content;
moving the scroll box in response to received input commands;
identifying one or more other users consuming portions of the body of content; and displaying icons identifying the one or more users at respective segments associated with the portions of the body of content the one or more users are respectively consuming.

* * * * *